United States Patent
Kabakura

(10) Patent No.: US 9,300,530 B2
(45) Date of Patent: Mar. 29, 2016

(54) MANAGEMENT DEVICE, MANAGEMENT METHOD, AND MEDIUM

(71) Applicant: NEC Corporation, Minato-ku, Tokyo (JP)

(72) Inventor: Masanori Kabakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 14/162,405

(22) Filed: Jan. 23, 2014

(65) Prior Publication Data

US 2014/0237306 A1     Aug. 21, 2014

(30) Foreign Application Priority Data

Feb. 19, 2013   (JP) ................... 2013-030128

(51) Int. Cl.
  *H04L 12/24* (2006.01)
  *H04L 29/08* (2006.01)
  *H04L 12/26* (2006.01)

(52) U.S. Cl.
  CPC ........ *H04L 41/0677* (2013.01); *H04L 41/0668* (2013.01); *H04L 43/0817* (2013.01); *H04L 43/16* (2013.01); *H04L 67/1097* (2013.01)

(58) Field of Classification Search
  CPC ............ H04L 41/0668; H04L 41/0677; H04L 43/0817; H04L 43/16; H04L 67/1097; G06F 11/1484; G06F 11/07; G06F 11/0703; G06F 11/0709; G06F 11/0712
  USPC ......................................................... 714/712
  See application file for complete search history.

(56) References Cited

U.S. PATENT DOCUMENTS

| | | | |
|---|---|---|---|
| 6,367,029 B1* | 4/2002 | Mayhead et al. ................. 714/2 |
| 6,782,490 B2* | 8/2004 | Maxemchuk et al. .......... 714/18 |
| 8,161,222 B1* | 4/2012 | Chamseddine et al. ....... 710/315 |
| 8,386,838 B1* | 2/2013 | Byan .............................. 714/6.2 |
| 8,719,624 B2* | 5/2014 | Machida ......................... 714/11 |
| 2004/0243650 A1* | 12/2004 | McCrory et al. .............. 707/203 |
| 2008/0250042 A1* | 10/2008 | Mopur et al. ................. 707/100 |
| 2009/0259737 A1* | 10/2009 | Aikoh et al. .................. 709/221 |
| 2010/0275203 A1* | 10/2010 | Shinohara et al. ................. 718/1 |
| 2010/0293256 A1* | 11/2010 | Machida ....................... 709/220 |
| 2014/0007239 A1* | 1/2014 | Sharpe et al. .................... 726/24 |

FOREIGN PATENT DOCUMENTS

JP     2009-252204 A     10/2009
JP     2011-232916 A     11/2011

* cited by examiner

*Primary Examiner* — James C Kerveros

(57) ABSTRACT

A management device includes a failure detection unit 10 which detects a failure in a plurality of paths connecting servers, on at least one of which a virtual machine operates, with a storage device, a specifying unit 11 which specifies the virtual machine operating on the failed server that is the server connected by the path in which the failure is detected, a redundancy calculation unit 12 which calculates, for each of the servers, a first redundancy degree of the server with respect to the storage device, a selection unit 13 which selects, among the servers, a server having the degree of redundancy higher than the degree of redundancy of the failed server on the basis of the first redundancy degrees of the servers, and a transmission unit 14 which transmits migration instruction information including an identifier of the specified virtual machine and an identifier of the selected server.

10 Claims, 17 Drawing Sheets

Fig. 5

| STORAGE ID | PATH ID | | PATH STATE |
| --- | --- | --- | --- |
| | SERVER SIDE PORT | STORAGE SIDE PORT | |
| STORAGE 1 | PORT A11 | PORT B11 | NORMAL |
| STORAGE 1 | PORT A12 | PORT B12 | NORMAL |
| STORAGE 1 | PORT A21 | PORT B11 | NORMAL |
| STORAGE 1 | PORT A22 | PORT B12 | NORMAL |
| STORAGE 2 | PORT A11 | PORT B21 | NORMAL |
| ⋮ | ⋮ | ⋮ | ⋮ |

Fig. 6

| VIRTUAL SERVER ID | STORAGE ID |
| --- | --- |
| VIRTUAL SERVER A1 | STORAGE 1, STORAGE 2 |
| VIRTUAL SERVER A2 | STORAGE 3 |
| ⋮ | ⋮ |

Fig. 8

| LOGICAL DISK ID | SERVER SIDE PORT ID | STORAGE SIDE PORT ID | PATH STATE |
|---|---|---|---|
| LOGICAL DISK 1 | SERVER PORT 1 | STORAGE PORT 1 | NORMAL |
| LOGICAL DISK 1 | SERVER PORT 2 | STORAGE PORT 2 | NORMAL |
| LOGICAL DISK 1 | SERVER PORT 3 | STORAGE PORT 3 | NORMAL |
| LOGICAL DISK 1 | SERVER PORT 4 | STORAGE PORT 4 | NORMAL |
| ⋮ | ⋮ | ⋮ | ⋮ |

Fig. 9

| VIRTUAL SERVER ID | VIRTUAL DISK ID |
|---|---|
| VIRTUAL SERVER 1 | VIRTUAL DISK 1 |
| VIRTUAL SERVER 2 | VIRTUAL DISK 2 |

Fig. 10

| VIRTUAL DISK ID | LOGICAL DISK ID |
|---|---|
| VIRTUAL DISK 1 | LOGICAL DISK 1 |
| VIRTUAL DISK 2 | LOGICAL DISK 3 |

Fig. 11

| VIRTUAL SERVER ID | PHYSICAL SERVER ID |
|---|---|
| VIRTUAL SERVER 1 | PHYSICAL SERVER 1 |
| VIRTUAL SERVER 2 | PHYSICAL SERVER 2 |

Fig. 13

| LOGICAL DISK | SERVER SIDE PORT | STORAGE SIDE PORT | PATH STATE |
|---|---|---|---|
| LOGICAL DISK 420a | PORT 110a1 | PORT 410a1 | NORMAL |
| LOGICAL DISK 420a | PORT 110a1 | PORT 410b1 | NORMAL |
| LOGICAL DISK 420a | PORT 110a2 | PORT 410a2 | NORMAL |
| LOGICAL DISK 420a | PORT 110a2 | PORT 410b2 | NORMAL |
| LOGICAL DISK 420b | PORT 110a1 | PORT 410a1 | NORMAL |
| LOGICAL DISK 420b | PORT 110a1 | PORT 410b1 | NORMAL |
| LOGICAL DISK 420b | PORT 110a2 | PORT 410a2 | NORMAL |
| LOGICAL DISK 420b | PORT 110a2 | PORT 410b2 | NORMAL |

Fig. 14

| VIRTUAL SERVER | VIRTUAL DISK |
|---|---|
| VIRTUAL SERVER 200a | VIRTUAL DISK 430a |

Fig. 15

| VIRTUAL DISK | LOGICAL DISK |
|---|---|
| VIRTUAL DISK 430a | LOGICAL DISK 420a |

Fig. 16

| LOGICAL DISK | SERVER SIDE PORT | STORAGE SIDE PORT | PATH STATE |
|---|---|---|---|
| LOGICAL DISK 420a | PORT 110b1 | PORT 410a1 | NORMAL |
| LOGICAL DISK 420a | PORT 110b1 | PORT 410b1 | NORMAL |
| LOGICAL DISK 420a | PORT 110b2 | PORT 410a2 | NORMAL |
| LOGICAL DISK 420a | PORT 110b2 | PORT 410b2 | NORMAL |
| LOGICAL DISK 420b | PORT 110b1 | PORT 410a1 | NORMAL |
| LOGICAL DISK 420b | PORT 110b1 | PORT 410b1 | NORMAL |
| LOGICAL DISK 420b | PORT 110b2 | PORT 410a2 | NORMAL |
| LOGICAL DISK 420b | PORT 110b2 | PORT 410b2 | NORMAL |

Fig. 17

| VIRTUAL SERVER | VIRTUAL DISK |
|---|---|
| VIRTUAL SERVER 200b | LOGICAL DISK 430b |

Fig. 18

| VIRTUAL DISK | LOGICAL DISK |
|---|---|
| VIRTUAL DISK 430b | LOGICAL DISK 420b |

Fig. 19

| VIRTUAL SERVER | PHYSICAL SERVER |
|---|---|
| VIRTUAL SERVER 200a | PHYSICAL SERVER 100a |
| VIRTUAL SERVER 200b | PHYSICAL SERVER 100b |

Fig. 20

| PHYSICAL SERVER | LOGICAL DISK | PATH REDUNDANCY |
|---|---|---|
| PHYSICAL SERVER 200a | LOGICAL DISK 420a | 4 |
| PHYSICAL SERVER 200b | LOGICAL DISK 420b | 4 |

Fig. 21

| PHYSICAL SERVER | LOGICAL DISK | PATH REDUNDANCY |
|---|---|---|
| PHYSICAL SERVER 100a | LOGICAL DISK 420a | 4 |
| PHYSICAL SERVER 100a | LOGICAL DISK 420b | 4 |
| PHYSICAL SERVER 100b | LOGICAL DISK 420a | 4 |
| PHYSICAL SERVER 100b | LOGICAL DISK 420b | 4 |

Fig. 22

| LOGICAL DISK | SERVER SIDE PORT | STORAGE SIDE PORT | PATH STATE |
|---|---|---|---|
| LOGICAL DISK 420a | PORT 110a1 | PORT 410a1 | FAILURE |
| LOGICAL DISK 420a | PORT 110a1 | PORT 410b1 | FAILURE |
| LOGICAL DISK 420a | PORT 110a2 | PORT 410a2 | NORMAL |
| LOGICAL DISK 420a | PORT 110a2 | PORT 410b2 | NORMAL |
| LOGICAL DISK 420b | PORT 110a1 | PORT 410a1 | FAILURE |
| LOGICAL DISK 420b | PORT 110a1 | PORT 410b1 | FAILURE |
| LOGICAL DISK 420b | PORT 110a2 | PORT 410a2 | NORMAL |
| LOGICAL DISK 420b | PORT 110a2 | PORT 410b2 | NORMAL |

Fig. 23

| VIRTUAL SERVER | LOGICAL DISK | PATH REDUNDANCY |
|---|---|---|
| VIRTUAL SERVER 200a | LOGICAL DISK 420a | 2 |
| VIRTUAL SERVER 200b | LOGICAL DISK 420b | 4 |

Fig. 24

| PHYSICAL SERVER | LOGICAL DISK | PATH REDUNDANCY |
| --- | --- | --- |
| PHYSICAL SERVER 100a | LOGICAL DISK 420a | 2 |
| PHYSICAL SERVER 100a | LOGICAL DISK 420b | 2 |
| PHYSICAL SERVER 100b | LOGICAL DISK 420a | 4 |
| PHYSICAL SERVER 100b | LOGICAL DISK 420b | 4 |

Fig. 25

| VIRTUAL SERVER | LOGICAL DISK | PATH REDUNDANCY |
| --- | --- | --- |
| VIRTUAL SERVER 200a | LOGICAL DISK 420a | 4 |
| VIRTUAL SERVER 200b | LOGICAL DISK 420b | 4 |

MANAGEMENT DEVICE, MANAGEMENT METHOD, AND MEDIUM

This application is based upon and claims the benefit of priority from Japanese Patent Application No. 2013-030128, filed on Feb. 19, 2013, the disclosure of which is incorporated herein in its entirety by reference.

TECHNICAL FIELD

The present invention relates to a management device, a management method, and a management program and in particular, relates to a management device of a virtual machine, a management method, and the management program.

BACKGROUND ART

An example of a device in which a virtual machine which operates on a physical computer is migrated to another physical computer when an event, such as a failure or a high load, occurs is described in patent document 1 and patent document 2.

In patent document 1, a management server which replaces a virtual server operating on a physical server in which a failure occurs with another virtual server operating on another physical server and makes the virtual server operate on the another physical sever is described. The management server disclosed in patent document 1 selects the virtual server which has the highest priority and whose amount of used resources is equal to or greater than that of the used resources of the virtual server to be moved among the virtual servers with lower priority than the virtual server to be moved. The used resources are performance of a processor and a memory capacity. The management server designates the physical server on which the selected virtual server operates as a movement destination of the virtual server to be moved. The management server designates the selected virtual server as the virtual server to be moved next and repeats the same process. The management server stops the operation of the virtual server which has low priority and for which there is no physical server designated as the relocation destination.

In patent document 2, a management computer which migrates a virtual server to another physical server when a migration trigger for the virtual server is detected is described. For example, the migration trigger for the virtual server is that an index value of a load of the virtual server exceeds a threshold value. The management computer selects a migration destination of the virtual server that is a migration object and a migration path on the basis of a migration path group set in advance, the past and current migration status of each physical server, and the like. The migration path is determined on the basis of a degree of coincidence of system configurations or whether or not the storage devices to be used are identical. The management computer migrates the virtual server that is the migration object on the basis of the migration destination and the migration path that are selected.

[Patent document 1] Japanese Patent Application Laid-Open No. 2009-252204
[Patent document 2] Japanese Patent Application Laid-Open No. 2011-232916

SUMMARY

Problems to be Solved by the Invention

There is a case in which, in order to improve robustness against failure of an access path, a plurality of paths are used for connection between a computer and a storage device accessed by the computer. When the computer and the storage device are connected by the plurality of paths, even if a failure occurs in one of the paths, the computer can access the storage device. However, when the number of paths which connect between the computer and the storage device decreases because of a failure occurs in one of the paths or the like, the robustness against failure of the access path decreases. The robustness of the virtual machine operating on a computer against failure of the access path to the storage device used by the virtual machine also decreases when the number of access paths between the computer on which the virtual machine operates and the storage device decreases.

In the technology described in patent documents 1 and 2, the computer that is the migration destination of the virtual machine is determined irrespective of a change in robustness against failure of the access path before and after the migration is performed. By using the technology described in patent documents 1 and 2, degradation of the robustness of the virtual machine against failure of the access path between the computer on which the virtual machine operates and the storage device cannot be avoided.

One of the objects of the present invention is to provide a management device which can reduce degradation of the robustness of the virtual machine operating on the computer connected to the storage device by a plurality of paths against failure of the path between the storage device and the computer.

Means to Solve the Problems

A management device comprises a failure detection unit which detects a failure in a plurality of paths connecting servers, on at least one of which a virtual machine operates, with a storage device, a specifying unit which specifies the virtual machine operating on the failed server that is the server connected by the path in which the failure is detected, a redundancy calculation unit which calculates, for each of the servers, a first redundancy degree of the server with respect to the storage device, which represents a degree of redundancy of the path between the server and the storage device, a selection unit which selects, among the servers, a server having the degree of redundancy higher than the degree of redundancy of the failed server on the basis of the first redundancy degrees of the servers, and a transmission unit which transmits migration instruction information including an identifier of the specified virtual machine and an identifier of the selected server.

A management method comprises detecting a failure in a plurality of paths which connect servers, on at least one of which a virtual machine operates, with a storage device, specifying the virtual machine operating on the failed server that is the server which is connected by the path in which the failure is detected, calculating, for each of the servers, a first redundancy degree of the server with respect to the storage device, which represents a degree of redundancy of the path between the server and the storage device, selecting, among the servers, a server having the degree of redundancy higher than the degree of redundancy of the failed server on the basis of the first redundancy degrees of the servers, and transmitting migration instruction information including an identifier of the specified virtual machine and an identifier of the selected server.

A non-transitory computer-readable medium storing a management program which causes a computer to function as a failure detection unit which detects a failure in a plurality of paths which connect servers, on at least one of which a virtual machine operates, with a storage device, a specifying unit which specifies the virtual machine operating on the failed server that is the server which is connected by the path in which the failure is detected, a redundancy calculation unit which calculates, for each of the servers, a first redundancy degree of the server with respect to the storage device, which represents a degree of redundancy of the path between the server and the storage device, a selection unit which selects, among the servers, a server having the degree of redundancy higher than the degree of redundancy of the failed server on the basis of the first redundancy degrees of the servers, and a transmission unit which transmits migration instruction information including an identifier of the specified virtual machine and an identifier of the selected server.

Effect of the Invention

The present invention has an effect in which degradation of the robustness of the virtual machine operating on a computer connected to a storage device by a plurality of paths against failure of the path between the storage device and the computer can be reduced.

BRIEF DESCRIPTION OF THE DRAWINGS

The Exemplary features and advantages of the present invention will become apparent from the following detailed description when taken with the accompanying drawings in which:

FIG. 5 is a figure showing an example of the path information table according to the first exemplary embodiment, FIG. 6 is a figure showing an example of the resource information table according to the first exemplary embodiment, FIG. 8 is a figure showing an example of the path information table in the configuration example, FIG. 9 is a figure showing an example of the resource information table 150 in the configuration example, FIG. 10 is a figure showing an example of the virtual disk information table 160 in the configuration example, FIG. 11 is a figure showing an example of the configuration information table 320 in the configuration example, FIG. 13 is a figure showing an example of the path information table in the specific example of a configuration example, FIG. 14 is a figure showing an example of the resource information table in the specific example of the configuration example, FIG. 15 is a figure showing an example of the virtual disk information table in the specific example of the configuration example, FIG. 16 is a figure showing an example of the path information table in the specific example of the configuration example, FIG. 17 is a figure showing an example of the resource information table in the specific example of the configuration example, FIG. 18 is a figure showing an example of the virtual disk information table in the specific example of the configuration example, FIG. 19 is a figure showing an example of the configuration information table in the specific example of the configuration example, FIG. 20 is a figure showing an example of the virtual server path redundancy in the specific example of the configuration example, FIG. 21 is a figure showing an example of the physical server path redundancy in the specific example of the configuration example, FIG. 22 is a figure showing an example of the path information table 140 after a failure occurs, FIG. 23 is a figure showing an example of the virtual server path redundancy recalculated after a failure occurs, FIG. 24 is a figure showing an example of the physical server path redundancy recalculated after a failure occurs, FIG. 25 is a figure showing an example of the virtual server path redundancy after migration is performed.

EXEMPLARY EMBODIMENT

Figure 1:
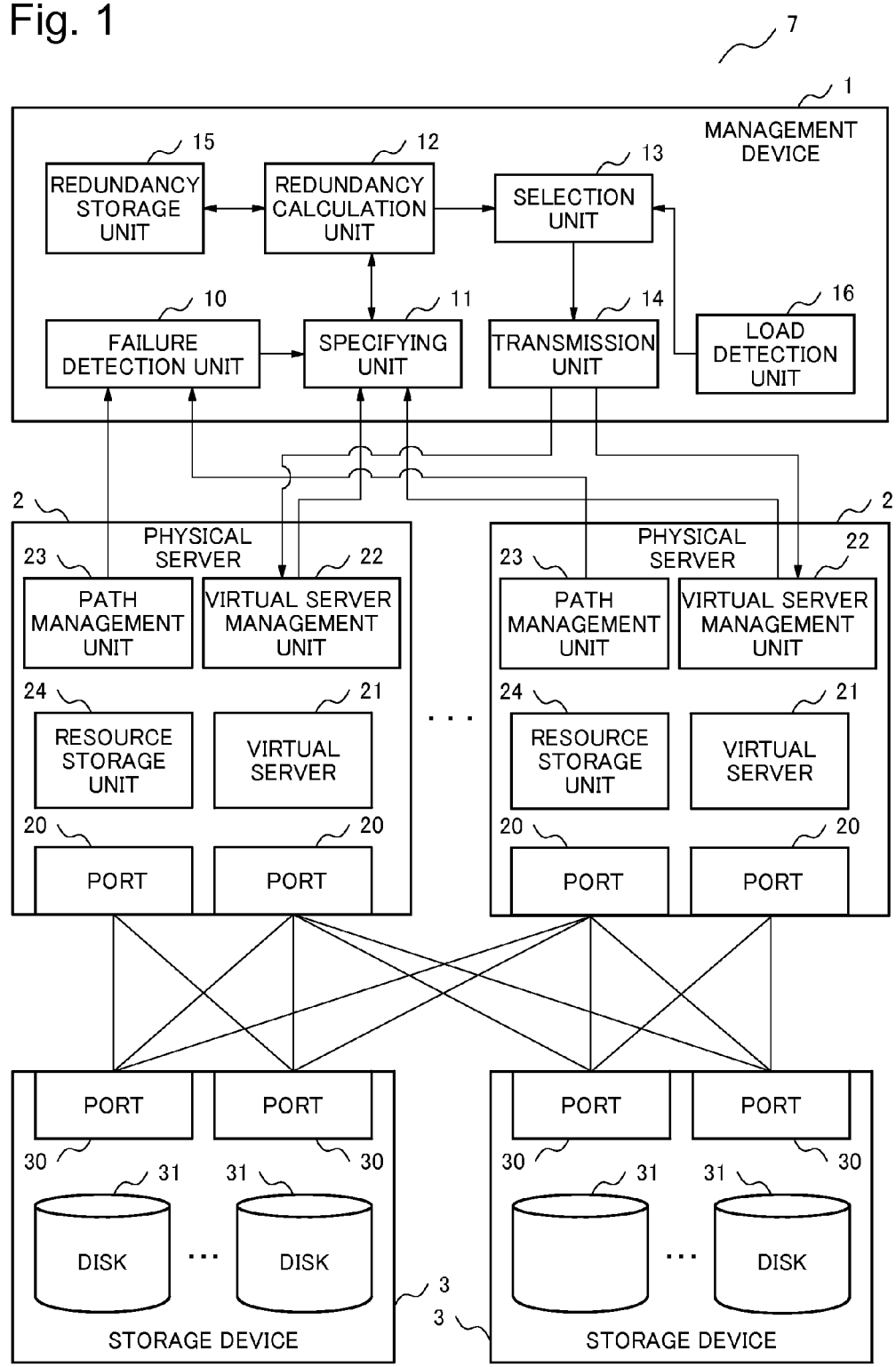
FIG. 1 is a figure showing an example of a configuration of an information processing system 7 according to a first exemplary embodiment.

Next, a first exemplary embodiment of the present invention will be described in detail with reference to the drawing.

FIG. 1 is a figure showing an example of a configuration of an information processing system 7 according to the first exemplary embodiment.

Referring to FIG. 1, the information processing system 7 includes a management device 1, two or more physical servers 2, and a storage device 3. The physical server 2 is described simply as the server. The information processing system 7 may include two or more storage devices 3. The management device 1 and the physical server 2 may be directly connected with each other via a wired or wireless connection. The management device 1 and the physical server 2 may be connected with each other via a communication network. In the following description, the communication network is described simply as the network. The management device 1 may be included in the physical server 2.

Figure 2:
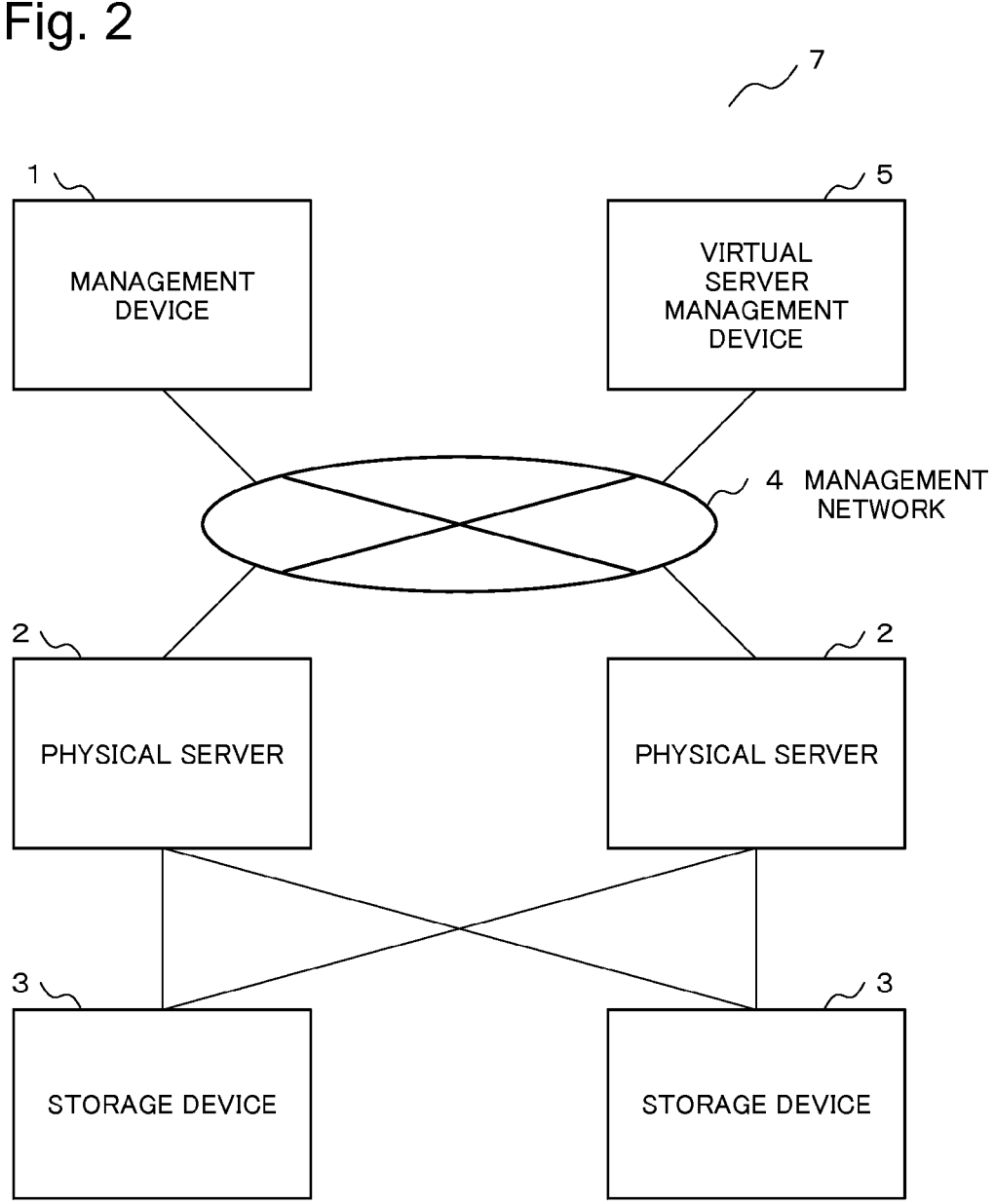
FIG. 2 is a figure showing an example of connection between the management device 1 and the physical server 2.

FIG. 2 is a figure showing an example of a connection between the management device 1 and the physical server 2.

In the example shown in FIG. 2, the management device 1 and the physical server 2 are connected with each other via a management network 4 that is a communication network. Further, the information processing system 7 may include a virtual server management device 5 to manage a resource of the physical server 2 for a virtual server 21 operating on the physical server 2. The physical server 2 and the virtual server management device 5 may be connected via the management network 4. The virtual server management device 5 transmits an instruction to generate the virtual server 21, an instruction to delete the virtual server 21, an instruction to allocate a disk 31 in the storage device 3 to the virtual server 21, an instruction to migrate the virtual server 21 to another physical server 2, or the like to each physical server 2. Each physical server 2 performs processes to the virtual server 21 according to the instructions from the virtual server management device 5. The virtual server management device 5 may be connected to each storage device 3 which provides a virtual disk. The virtual server management device 5 may instruct the storage device 3 to migrate the virtual disk provided by the storage device 3 to another storage device 3. In FIG. 1, the virtual server management device 5 is not shown. Further, the management device 1 may operate as the virtual server management device 5. In the case, the information processing system 7 may not include the virtual server management device 5 provided outside the management device 1.

Each physical server 2 and the storage device 3 are connected with each other via a plurality of paths. For example, each physical server 2 and the storage device 3 are connected with each other by a plurality of cables. Each of the plurality of cables connects one of the ports 20 included in the physical server 2 and one of the ports 30 included in the storage device 3. Two or more of the ports 30 included in one storage device 3 may be connected to one port among the ports 20 of the physical server 2. Two or more of the ports 20 of the physical server 2 may be connected to one port among the ports 30 of the storage device 3. A communication path via the port 20 of the physical server 2 and the port 30 of the storage device 3 that are connected with each other is a path connecting between the physical server 2 and the storage device 3. The number of the combinations of the ports 20 of a certain physical server 2 and the ports 30 of a certain storage device 3 that are connected with each other is the number of the paths connecting between the physical server 2 and the storage device 3. The physical server 2 accesses the storage device 3 via one of the paths. FIG. 1 shows one example of the connection between the physical server 2 and the storage device 3. The connection between the physical server 2 and the storage device 3 is not limited to the configuration shown in FIG. 1.

Figure 3:
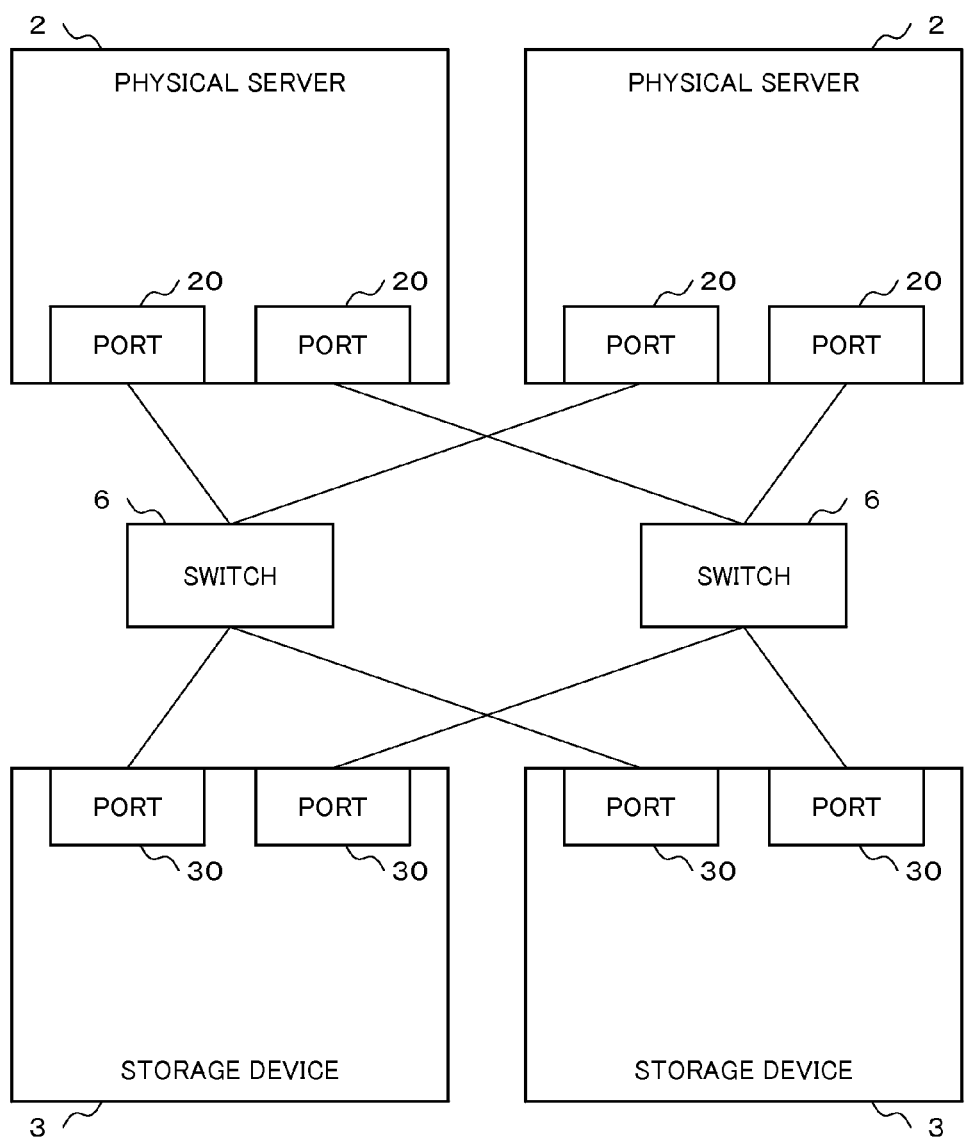
FIG. 3 is a figure showing an another example of connection between the physical server 2 and the storage device 3.

FIG. 3 shows another example of the connection between the physical server 2 and the storage device 3.

In the example shown in FIG. 3, each physical server 2 and each storage device 3 are connected with each other via a switch 6. For example, the switch 6 is an FC (Fiber Channel) switch. In this case, each of the ports 20 of an FC HBA (Host Bus Adapter) of the physical server 2 is connected to the FC switch by an FC cable. The FC switch is connected to the port 30 that is an FC port of the storage device 3 by the FC cable. Each physical server 2 accesses each storage device 3 by using an FC protocol. The switch 6 may be a network switch of an IP (Internet Protocol) network. In this case, each physical server 2 accesses each storage device 3 by using, for example, the iSCSI (Internet Small Computer System Interface) protocol.

The management device 1 includes a failure detection unit 10, a specifying unit 11, a redundancy calculation unit 12, a selection unit 13, a transmission unit 14, and a redundancy storage unit 15. The management device 1 may include a load detection unit 16.

Each physical server 2 includes the plurality of ports 20, a virtual server management unit 22, a path management unit 23, and a resource storage unit 24. Further, in each physical server 2, the virtual server 21 operates. The virtual server 21 is also described as the virtual machine. Although the number of the virtual servers 21 in the example shown in FIG. 1 is one, the number of the virtual servers 21 is not limited to one.

Each storage device 3 includes the plurality of ports 30 and the disk 31. Each storage device 3 may include the plurality of disks 31. The disk 31 may be a logical disk composed using one or more hard disk drives. The disk 31 may be a virtual disk composed using all or a part of one or more logical disks.

The virtual server management unit 22 allocates resources such as a processor, a memory, a disk, and the like to the virtual server 21. The virtual server management unit 22 configures the virtual server 21 and starts the virtual server 21 operating. Further, when the virtual server management unit 22 receives an instruction to migrate a virtual server 21 to another physical server 2, the virtual server management unit 22 performs the migration to migrate the virtual server 21 to another physical server 2 on the basis of the instruction. The instruction to migrate a virtual server 21 to another physical server 2 includes an identifier of the virtual server 21 to be migrated and an identifier of the physical server 2 that is a migration destination of the virtual server 21. The instruction to migrate a virtual server 21 to another physical server 2 may be the identifier of the virtual server 21 to be migrated and the identifier of the physical server 2 that is the migration destination of the virtual server 21. Further, the virtual server management unit 22 associates the identifier of the virtual server 21 with the identifier of the storage allocated to the virtual server 21 for each virtual server 21 on the physical server 2 and stores the identifier of the virtual server 21 and the identifier of the storage in the resource storage unit 24. The identifier of the storage is, for example, the identifier of the disk 31 or the identifier of the storage device 3 including the disk 31. The virtual server management unit 22 may store the number of the processors, the identifier of the processor, the capacity of the memory, and the like that are allocated to each virtual server 21 on the physical server 2 in the resource storage unit 24.

The resource storage unit 24 stores the identifier of the storage that is allocated to the virtual server 21 for each virtual server 21 on the physical server 2. For example, the resource storage unit 24 stores the identifier of the virtual server 21 and the identifier of the disk 31 allocated to the virtual server 21 for each virtual server 21, which are associated with each other. And the resource storage unit 24 stores the identifier of the virtual server 21 and the identifier of the storage device 3 including the disk 31 allocated to the virtual server 21 for each virtual server 21, which are associated with each other. When the disk 31 is the virtual disk, the resource storage unit 24 may store the identifier of the virtual server 21 and the identifier of the virtual disk allocated to the virtual server 21, which are associated with each other. The resource storage unit 24 may store the identifier of the virtual disk and the identifier of the logical disk of which the virtual disk is composed for each virtual disk, which are associated with each other. The resource storage unit 24 may store the identifier of the logical disk and the identifier of the storage device 3 including the logical disk for each logical disk, which are associated with each other. The resource storage unit 24 may store, in addition to the identifier of the virtual server 21, the number of the processors, the identifier of the processor, the capacity of the memory, and the like that are allocated to the virtual server 21 for each virtual server 21, which are associated with the identifier of the virtual server 21.

The path management unit 23 detects a presence or absence of a communication failure in the path between the physical server 2 and the storage device 3 for each path. For example, when an I/O (Input/Output) error occurs during the access to the storage device 3, the path management unit 23 detects the occurrence of failure in the path by identifying the path used for the access. When the I/O error occurs, the path management unit 23 reissues the I/O request to continue the I/O process. When the failure is detected in one of the paths, the path management unit 23 may inform the failure detection unit 10 of the management device 1 of the occurrence of failure. As described above, the communication line via the port 20 of the physical server 2 and the port 30 of the storage device 3 that is connected to the port 20 is the path between the physical server 2 and the storage device 3 which are connected with each other.

The path management unit 23 associates a path state that is information indicating the presence or absence of the detected failure with the identifier of the path and stores the path state and the identifier of the path in the resource storage unit 24 for each path. The path state is represented by two predetermined values: a value indicating a "normal" state and a value indicating a "failure" state. When the I/O error occurs, the path management unit 23 updates the path state associated with the identifier of the path in which the I/O error occurs and changes the path state to the "failure" state. Hereinafter, the path is also described as an access path. The identifier of the path is, for example, a combination of the identifier of the port 20 of the physical server 2 and the identifier of the port 30 of the storage device 3. An arbitrary identifier can be used for the identifier of the path if the path can be identified by the identifier.

The path management unit 23 may associate the identifier of each of the storages accessed by the physical server 2 with a set of the identifier and the path state of each path to the storage and store the identifier and the set in the resource memory unit 24. As described above, the identifier of the storage is, for example, the identifier of the disk 31 or the identifier of the storage device 3 including the disk 31. For example, when the resource storage unit 24 stores the identifier of the virtual server 21 and the identifier of the storage device 3 which are associated with each other, the identifier of the storage which the path management unit 23 associates with the set of the identifier and the path state of the path is the identifier of the storage device 3. For example, when the resource storage unit 24 stores the identifier of the virtual server 21 and the identifier of the disk 31 which are associated with each other, the identifier of the storage which the path management unit 23 associates with the set of the identifier and the path state of the path is the identifier of the disk 31. When the disk 31 is the virtual disk, the identifier of the storage may be the identifier of the logical disk.

The resource storage unit 24 further stores the path state that is information indicating the presence or absence of the failure detected for each path and the identifier of the path, which are associated with each other. For example, the resource storage unit 24 may store the set of the identifier and the path state of each of the paths between the physical server 2 and the storage, which is associated with the identifier of the storage, for each of the storages accessed by the physical server 2.

The failure detection unit 10 detects the presence or absence of the failure in the path by which the physical server 2 accesses the storage device 3 for each path.

The specifying unit 11 specifies the virtual server 21 affected by the failure, that is, estimated to be affected by the failure, among the virtual servers 21 operating on the physical server 2 connected to the storage by the path in which the failure is detected. The virtual server 21 specified by the specifying unit 11 is the virtual server 21 that is the migration object.

The redundancy calculation unit 12 calculates a degree of redundancy that is a value representing a redundancy level of the path between the physical server 2 and the storage device 3. In the following description, it is assumed that when the value of the degree of redundancy is large, the redundancy level of the path is high. However, the relation between the value of the degree of redundancy and the redundancy level may have an inverse relation. The degree of redundancy of the path between the physical server 2 and the storage device 3 calculated by the redundancy calculation unit 12 is described as a physical server path redundancy degree. The physical server path redundancy degree may be described as a first redundancy degree. The physical server path redundancy degree is described simply as the redundancy degree. Further, for each of the plurality of physical servers 2, the redundancy calculation unit 12 calculates the first redundancy degree of the path between the physical server 2 and the storage device 3 used by the virtual server 21. When the virtual server 21 uses two or more of the storage devices 3, the redundancy calculation unit 12 calculates the first redundancy degree of the path between the physical server 2 and each of the storage devices 3 used by the virtual server 21. The redundancy calculation unit 12 selects the value corresponding to the lowest redundancy level from the first redundancy degree of the path between the physical server 2 and each of the storage devices 3 used by the virtual servers 21 as the second redundancy degree of the physical server 2 with respect to the virtual server 21. The second redundancy degree is described as the virtual server path redundancy degree. The second redundancy degree represents a redundancy level of the path between the physical server 2 and the storage device 3 including the disk 31 used by the virtual server 21. That is, the second redundancy degree represents the redundancy level of the path between the virtual server 21 and the disk 31 used by the virtual server 21 when the virtual server 21 operates on the physical server 2. The second redundancy degree is determined for the combination of the physical server 2 and the virtual server 21.

For the virtual server 21 affected by the failure, the selection unit 13 selects a physical server 2 whose second redundancy degree is higher than that of the physical server 2 on which the virtual server 21 operates. For the virtual server 21 affected by the failure, the selection unit 13 selects the physical server 2 having the highest second redundancy degree, whose value represents the highest redundancy, among the physical servers 2, for example. The selection unit 13 may not necessarily select the physical server 2 with the highest second redundancy degree. It is sufficient that the second redundancy degree of the selected physical server 2 is higher than that of the physical server 2 on which the virtual server 21 affected by the failure operates. The physical server 2 selected by the selection unit 13 is the physical server 2 that is the migration destination of the virtual server 21 which is the migration object. When two or more virtual servers 21 are specified, the selection unit 13 selects, for each of the specified virtual servers 21, the physical server 2 whose value of the second redundancy degree with respect to the virtual server 21 represents the highest redundancy among the second redundancy degrees with respect to the specified virtual servers 21.

The transmission unit 14 outputs information on a migration instruction including the identifier of the virtual server 21 affected by the failure and the identifier of the physical server selected as the physical server 2 whose second redundancy degree with respect to the virtual server 21 is the highest second redundancy degree. The information on the migration instruction is described simply as the migration instruction. The migration instruction transmitted by the transmission unit 14 is an instruction to migrate the virtual server 21 that is the migration object to the physical server 2 that is the migration destination. For example, to the physical server 2 on which the virtual server 21 affected by the detected failure operates, the transmission unit 14 transmits the migration instruction to migrate the virtual server 21 to the physical server selected as the physical server 2 with the highest second redundancy degree. The identifier of the virtual server 21 included in the migration instruction is the identifier of the virtual server 21 that is the migration object. The identifier of the physical server 2 included in the migration instruction is the identifier of the physical server 2 that is the migration destination. The instruction to migrate the virtual server 21 that is the migration object to the physical server 2 that is the migration destination may be the identifier of the virtual server 21 that is the migration object and the identifier of the physical server 2 that is the migration destination. In this case, the transmission unit 14 transmits the identifier of the virtual server 21 and the identifier of the selected physical server 2 to the physical server 2 on which the virtual server 21 affected by the detected failure operates. When the physical server 2 receives the identifier of the virtual server 21 and the identifier of the physical server 2, the physical server 2 performs the migration to migrate the virtual server 21 identified by the received identifier to the physical server 2 identified by the received identifier. The arbitrary existing migration method can be used as the migration method. The output destination of the migration instruction may be the virtual server management device 5. In this case, the virtual server management device 5 may perform a process to migrate the virtual server 21 whose identifier is included in the migration instruction to the physical server 2 whose identifier is included in the migration instruction. For example, the output destination of the migration instruction may be a terminal of an administrator of the information processing system 7. The terminal of the administrator of the information processing system 7 may display information on the received migration instruction to the administrator. The administrator may perform the process to migrate the virtual server 21 whose identifier is included in the migration instruction to the physical server 2 whose identifier is included in the migration instruction. The terminal of the administrator of the information processing system 7 is not shown in the figures.

The load detection unit 16 detects an amount of a load of each of the physical servers 2.

The redundancy storage unit 15 stores the second redundancy degree with respect to each virtual server 21 operating on each of the physical servers 2. The redundancy storage unit 15 may store the identifier of the virtual server 21 and the second redundancy degree for each of the virtual servers 21.

Next, the operation of the management device 1 according to the exemplary embodiment will be described in detail with reference to the drawing.

Figure 4:
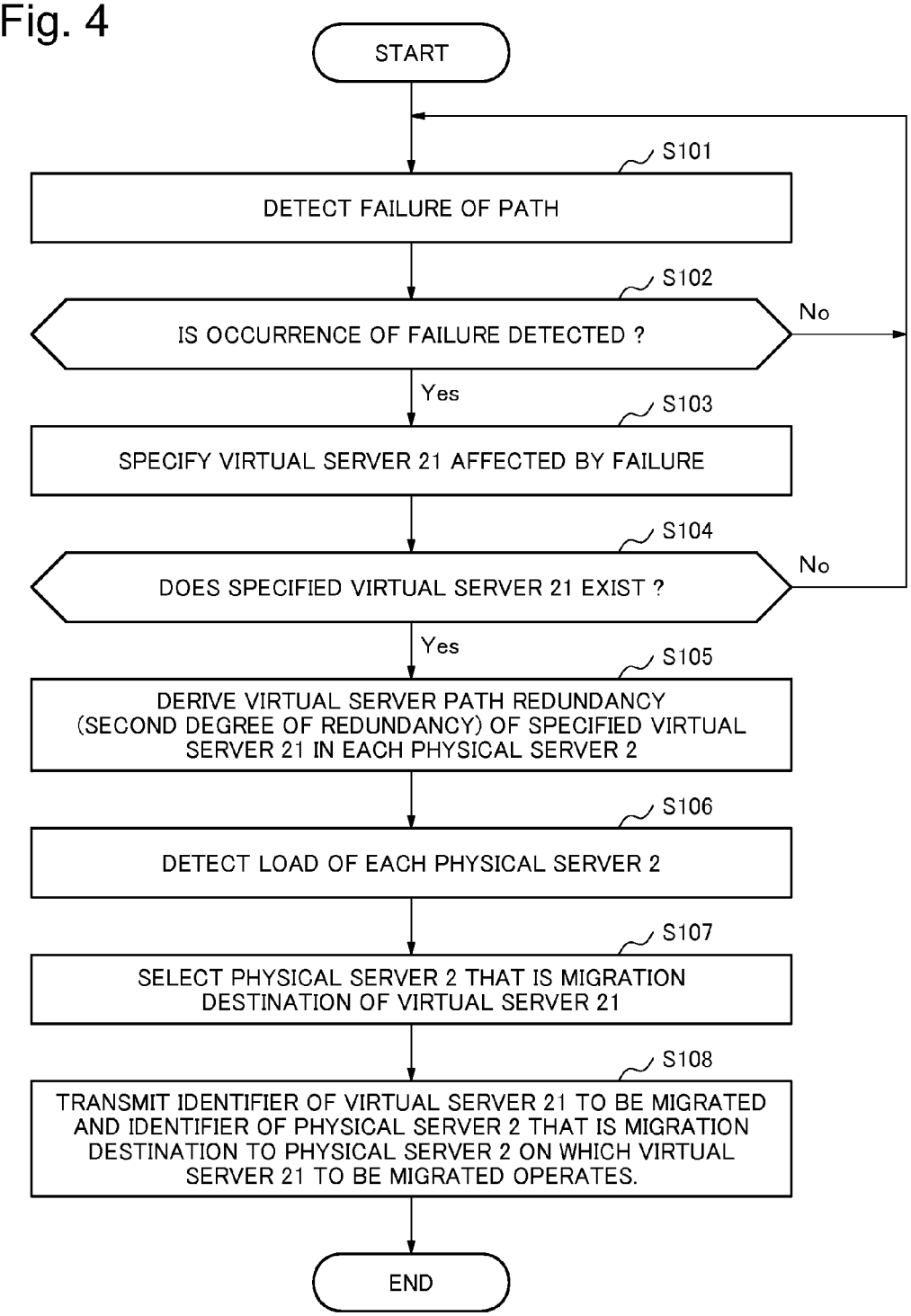
FIG. 4 is a flowchart showing an operation of the management device 1 according to the first exemplary embodiment.

FIG. 4 is a flowchart showing the operation of the management device 1 according to the exemplary embodiment.

In an example of the exemplary embodiment, at a start time of the operation shown in FIG. 4, information indicating a presence or absence of a failure of each path connecting between the physical server 2 and the storage device 3 is stored in the resource storage unit 24 of each physical server 2, for example, as a path information table described later. Further, information to associate the path between the physical server 2 on which the virtual server 21 operates and the storage device 3 including the disk 31 used by the virtual server 21 with the virtual server 21 is stored in the resource storage unit 24 of each physical server 2. For example, the information to associate the path with the virtual server 21 is a resource information table described later. Further, the information to associate the path with the virtual server 21 may include a virtual disk information table and a disk information table described later.

FIG. 5 is a figure showing an example of the path information table stored in the resource storage unit 24 of the physical server 2. The path information table shown in FIG. 5 includes a set of a storage ID (Identifier), a path ID, and the path state. The storage ID is the identifier of the storage device 3. The path ID is the identifier of the path connecting between the physical server 2 including the resource storage unit 24 storing the path information table and the storage device 3. In an example shown in FIG. 5, the path ID is represented by a set of the identifier of a server side port and the identifier of a storage side port. The server side port is the port 20 included in the physical server 2. The identifier of the storage side port is the port 30 included in the storage device 3. The path state shows the presence or absence of the failure that is detected in the path connecting between the physical server 2 and the storage device 3. In an example shown in FIG. 5, when the path state is "normal," the failure is not detected in the path. When the path state is "failure," the failure is detected in the path. In the path information table, the disk ID instead of the storage ID may be associated with the path ID and the path state. The disk ID is the identifier of the disk 31 included in the storage device 3.

FIG. 6 is a figure showing an example of the resource information table stored in the resource storage unit 24 of the physical server 2. The resource information table shown in FIG. 6 includes a set of the virtual server ID and the storage ID. In an example shown in FIG. 6, the virtual server ID is the identifier of the virtual server 21 operating on the physical server 2 that includes the resource storage unit 24 storing the disk information table. The storage ID associated with the virtual server ID is the storage ID of the storage device 3 including the disk 31 used by the virtual server 21 to which the virtual server ID is assigned. For example, the disk 31 used by the virtual server 21 is the disk 31 allocated to the virtual server 21 by the virtual server management unit 22. In an example shown in FIG. 6, the virtual server 21 whose identifier is "virtual server A1" uses the disk 31 included in the storage device 3 whose storage ID is "storage 1" and the disk 31 included in the storage device 3 whose storage ID is "storage 2."

The resource information table may include a set of the virtual server ID and the disk ID of the disk 31 used by the virtual server 21 to which the virtual server ID is assigned instead of the set of the virtual server ID and the storage ID. In that case, the resource storage unit 24 further stores the disk information table. The disk information table is a table including a set of the disk ID of the disk 31 and the storage ID of the storage device 3 including the disk 31 for each disk 31. When the disk 31 is the virtual disk, the resource storage unit 24 may further store a logical disk information table. The logical disk information table is a table including, for each disk 31 which is the virtual disk, a set of the virtual disk ID of the disk 31 and the logical disk ID of the logical disk of which the disk 31 is composed. The virtual disk may not be associated with the logical disk in one to one correspondence. A plurality of virtual disks may be composed of one logical disk. One virtual disk may be composed of a plurality of logical disks. The disk information table may include, for each logical disk, a set of the logical disk ID of the logical disk and the storage ID of the storage device 3 including the logical disk.

Referring to FIG. 4, first, the failure detection unit 10 detects the failure of the path between each physical server 2 and each storage device 3 (step S101).

The failure detection unit 10 detects the failure in the paths between each physical server 2 and each storage device 3 by the arbitrary existing method. For example, the failure detection unit 10 may detect the failure in each path by receiving the identifier of the path in which the failure occurs from each physical server 2. In the case, each physical server 2 may be configured so that it detects the failure of the path. And each physical server 2 may be configured so that it transmits the path ID of the path in which the failure is detected to the failure detection unit 10. Alternatively, each physical server 2 may be configured so that when the failure of the path is detected, the path state of the path in which the failure is detected, which is stored in the resource storage unit 24, is changed from "normal" to "failure." In that case, the failure detection unit 10 may read out the path state from the resource storage unit 24. By detecting the change of the path state from "normal" to "failure," the failure detection unit 10 may detect the occurrence of the failure in the path to which the path ID associated with the change-detected path state is assigned. In that case, the failure detection unit 10 may store the path state which is read out. When the path state stored in the failure detection unit 10 is "normal" and the path state newly read from the resource storage unit 24 is "failure," it may be determined by the failure detection unit 10 that the failure occurs in the path. The failure detection unit 10 may detect the failure of the path by detecting the I/O error from a history, which is stored in each physical server 2, of the access to the storage device 3. In that case, each physical server 2 may be configured so that it stores the I/O error which occurs in the access to the storage device 3 as the history of the access.

When the failure is not detected in all the paths (No in step S102), the process returns to step S101.

When the failure is detected in one of the paths (Yes in step S102), the specifying unit 11 specifies the virtual server 21 affected by the failure (step S103).

The specifying unit 11 compares the second redundancy degrees, which are derived before and after the occurrence of the detected failure, with respect to the virtual server 21 in the physical server 2 on which the virtual server 21 operates, for each virtual server 21 operating on the physical server 2, for example. As described above, the second redundancy degree is also described as the virtual server path redundancy degree. The specifying unit 11 specifies, as the virtual server 21 affected by the failure, the virtual server 21 whose second redundancy degree (virtual server path redundancy degree) in the physical server 2 on which the virtual server 21 operates decreases because of, for example, the occurrence of the detected failure.

The second redundancy degree is derived by the redundancy calculation unit 12 as follows, for example. First, the redundancy calculation unit 12 reads out the path information table from the resource storage unit 24 of the physical server 2. The redundancy calculation unit 12 calculates the number of the paths whose path state is "normal" for each of the storage devices 3 on the basis of the path information table. The redundancy calculation unit 12 sets, for each of the storage devices 3, the number of the paths whose path state is "normal" as the first redundancy degree (physical server path redundancy degree) of the path between the storage device 3 and the physical server 2 including the resource storage unit 24 from which the path information table is read out.

Further, the redundancy calculation unit 12 reads out the resource information table from the resource storage unit 24 of the physical server 2. When the virtual disk information table and the disk information table are stored in the resource storage unit 24 of the physical server 2, the redundancy calculation unit 12 reads those tables out. The redundancy calculation unit 12 sets the first redundancy degree of the path between the physical server 2 and the storage device 3 used by the virtual server 21 operating on the physical server 2 as the second redundancy degree. When the virtual server 21 uses the plurality of storage devices 3, the redundancy calculation unit 12 sets the lowest among the first redundancy degrees of the path between the physical server 2 and the storage devices 3 used by the virtual server 21 operating on the physical server 2 as the second redundancy degree.

Further, the redundancy storage unit 15 stores the second redundancy degree for each virtual server 21, which is derived by the redundancy calculation unit 12 at the time of last derivation.

The specifying unit 11 compares the second redundancy degree stored in the redundancy storage unit 15 with the newly derived second redundancy degree for each of the virtual servers 21. The specifying unit 11 specifies the virtual server 21 whose newly derived second redundancy degree is smaller than the second redundancy degree stored in the redundancy storage unit 15 as the virtual server 21 affected by the detected failure. That is, the specifying unit 11 specifies the virtual server 21 whose second redundancy degree decreases as the virtual server 21 affected by the detected failure.

When the virtual server 21 affected by the failure is not specified (No in step S104), the process returns to step S101.

When the virtual server 21 affected by the failure is specified (Yes in step S104), the redundancy calculation unit 12 derives the second redundancy degree with respect to the specified virtual server 21 in each of the physical servers 2 (step S105). As described above, the second redundancy degree is also described as the virtual server path redundancy degree.

In this exemplary embodiment, for the physical server 2 on which the specified virtual server 21 operates, the second redundancy degree with respect to the virtual server 21 has already been derived in step S103. The redundancy calculation unit 12 may calculate the second redundancy degree with respect to the virtual server 21 when the specified virtual server 21 is migrated to each of the other physical servers 2. The other physical servers 2 are the physical servers 2 other than the physical server 2 on which the specified virtual server 21 operates. The method of calculating the second redundancy degree is the same method of calculating the second redundancy degree explained in step S103.

The management device 1 may perform the operation of step S106 between step S105 and step S107. The management device 1 may not perform the operation of step S106. When the management device 1 does not perform the operation of step S106, the management device 1 performs the operation of step S107 after step S105.

In step S106, the load detection unit 16 detects the load of each physical server 2. The load detected by the load detection unit 16 is, for example, a CPU usage rate of the physical server 2, a memory usage rate of the physical server 2, a network usage rate of the physical server 2, or the like. The load detected by the load detection unit 16 may be the load, which is represented by, for example, an arbitrary existing index selected by a designer of the information processing system 7, of the physical server 2. In case the process of step S106 is not performed, the load detection unit 16 may not exist.

Next, the selection unit 13 selects the physical server 2 which is the migration destination of the virtual server 21 (step S107).

For each of the virtual servers 21 affected by the failure, which is specified in step S103, the selection unit 13 selects the physical server 2 as the migration destination. The selection unit 13 selects the physical server 2 whose second redundancy degree with respect to the virtual server 21, which is calculated in step S105, is, for example, the highest among second redundancy degrees with respect to the virtual server 21 as the physical server 2 which is the migration destination for the virtual server 21.

In case the process of step S106 is performed and the load of each physical server 2 is detected, the selection unit 13 may exclude the physical server 2 whose detected load exceeds a predetermined threshold value from candidates of selection. And the selection unit 13 may select the physical server 2 from the remaining physical servers 2 as described above.

Next, the transmission unit 14 transmits the identifier of the virtual server 21 specified in step S103 and the identifier of the physical server 2 selected as the migration destination for the virtual server 21 to the physical server 2 on which the virtual server 21 operates (step S108). The transmission unit 14 performs the operation of step S108 to all the virtual servers 21 specified in step S103.

The physical server 2 which receives the identifier of the virtual server 21 and the identifier of another physical server 2 migrates the virtual server 21 identified by the received identifier to the physical server 2 identified by the received identifier. An arbitrary existing migration method may be used as the method to migrate the virtual server 21. When the second redundancy degree with respect to the virtual server 21 in the physical server 2 on which the virtual server 21 specified in step S103 operates is the highest among the second redundancy degrees with respect to the virtual servers 21 in all the physical servers 2, the transmission unit 14 does not perform the operation of step S108.

Further, the above-described operation of step S108 is shown as an example. Therefore, the operation of step S108 is not limited to the operation described above. In step S108, at least a process in which the virtual server 21 to be migrated is migrated to the physical server 2 that is the migration destination is performed. For example, the transmission unit 14 may transmit the identifier of the virtual server 21 specified in step S103 and the identifier of the physical server 2 selected as the migration destination of the virtual server 21 to a supervisor server (not shown). And the supervisor server may perform a process to migrate the virtual server 21 to be migrated to the physical server 2 that is the migration destination. Alternatively, the transmission unit 14 may transmit the identifier of the virtual server 21 specified in step S103 and the identifier of the physical server 2 selected as the migration destination of the virtual server 21 to the physical server 2 that is the migration destination. And the physical server 2 that is the migration destination may perform the process to migrate the virtual server 21 to be migrated to the physical server 2 that is the migration destination.

The above-described exemplary embodiment has an effect in which degradation of the robustness against failure in the path between the storage device 3 and the physical server 2 with respect to the virtual server 21 operating on the physical server 2 connected to the storage device 3 via the plurality of paths can be reduced.

The reason is because the selection unit 13 selects the physical server 2 with the highest above-described second redundancy degree with respect to the virtual server 21 which is specified as the virtual server 21 affected by the failure. The virtual server 21 affected by the failure is the virtual server 21 whose redundancy of the path between the physical server 2 on which the virtual server 21 operates and the storage device 3 used by the virtual server 21 is decreased by the failure. The physical server 2 with the highest second redundancy degree is the physical server 2 whose redundancy of the path between the physical server 2 and the storage device 3 used by the virtual server 21 is the highest. When the virtual server 21 specified in step S106 is migrated to the physical server 2 with the highest second redundancy degree, decrease of the redundancy of the path between the physical server 2 on which the virtual server 21 operates and the storage device 3 used by the virtual server 21 becomes small.

(Configuration Example)

Next, a configuration example of the information processing system 7 according to the first exemplary embodiment will be described in detail with reference to the drawing.

Figure 7:
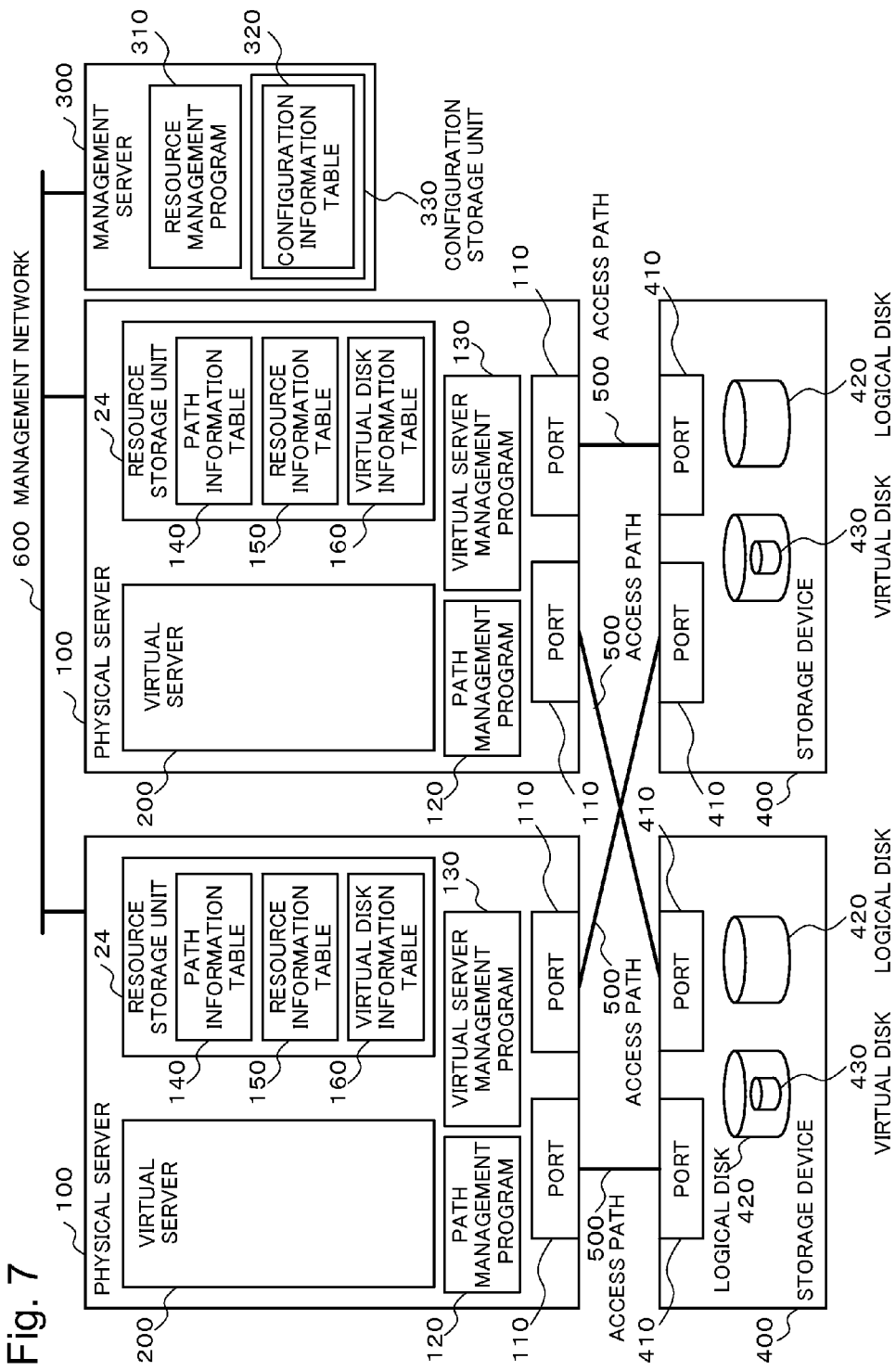
FIG. 7 is a figure showing a configuration of a computer system in the configuration example.

FIG. 7 is a figure showing a configuration of a computer system of the configuration example.

The relationship among components shown in FIG. 7 and components shown in FIG. 1 and FIG. 2 is as follows.

The computer system corresponds to the information processing system 7. A physical server 100 corresponds to the physical server 2. A storage device 400 corresponds to the storage device 3. A management server 300 corresponds to the management device 1 and the virtual server management device 5. A management network 600 corresponds to the management network 4. An access path 500 is the path between the physical server 2 and the storage device 3. A virtual server 200 corresponds to the virtual server 21.

When executing a path management program 120, a processor (not shown) of the physical server 100 functions as the path management unit 23. A port 110 corresponds to the port 20. Hereinafter, in this explanation, the operation performed by the processor executing each program will be described as the operation performed by the program. Actually, the processor performs a certain operation when executing a certain program. However, in this explanation, it is described as "a certain program performs a certain operation," for example. Further, actually, a certain data is transmitted to a device including a processor that executes a certain program. However, in this explanation, it is described as "a certain data is transmitted to a certain program executed in the device."

A virtual disk 430 corresponds to the disk 31. The virtual disk 430 is created on a logical disk 420. A port 410 corresponds to the port 30.

When executing a resource management program 310, a processor (not shown) of the management server 300 functions as all the units but the redundancy storage unit 15 of the virtual server management unit 22 and the management device 1. A memory (not shown) of the management server 300 operates as the redundancy storage unit 15. Further, when the processor (not shown) of the management server 300 executes the resource management program 310, the management server 300 functions as the virtual server management device 5.

The computer system in the configuration example is composed using two or more physical servers 100, one management server 300, and two or more storage devices 400.

The physical server 100 includes two or more ports 110. In the physical server 100, one path management program 120, one virtual server management program 130, and one or more virtual servers 200 operate. The physical server 100 includes a path information table 140 as information used by the path management program 120. Further, the physical server 100 includes a resource information table 150 and a virtual disk information table 160 as information used by the virtual server management program 130. The path information table 140, the resource information table 150, and the virtual disk information table 160 are stored in the resource storage unit 24.

In the management server 300, the processor (not shown) executes the resource management program 310. The management server 300 includes a configuration storage unit 330 storing a configuration management table 320 including information used by the resource management program 310.

The storage device 400 has two or more ports 410 and one or more logical disks 420. The logical disk 420 may include an arbitrary number of the virtual disks 430 in the storage area of the logical disk 420.

The access path 500 is a path connecting one port 110 on the certain physical server 100 and one port 410 on the certain storage device 400.

In the computer system according to the configuration example, there are two or more access paths 500 to access from each physical server 100 to each storage device 400. As described above, one access path 500 is a path connecting the certain port 110 on one physical server 100 and the port 310 on one storage device 300.

As an example of a method of installing the access path 500, there is a method in which an FC HBA installed in the physical server is connected with an FC port of the storage device using an FC cable via an FC switch and an FC protocol is used. As an example of a method of installing the access path 500, there is a method in which an IP network is used for the connection and the iSCSI protocol is used. In the configuration example, the access path 500 is installed by using the connection method in which the FC protocol is used.

In the computer system in the configuration example, all the physical servers 100 and the management servers 300 are connected with each other via the management network 600.

Next, the program which operates on the physical server 100 will be described.

The path management program 120 is a program which manages the access paths 500 from the physical server 100 to the logical disk 420 on the storage device 400. When a failure occurs in an access path, the path management program 120 ensures redundancy with respect to the access path by performing a failover in which communication via the access path is taken over by another access path. Further, the path management program 120 carries out load balancing by issuing the I/O request to the plurality of access paths.

The virtual server management program 130 is a program which manages the virtual servers 200 operating on the physical servers 100. The virtual server management program 130 manages the virtual disk 430 used by each of the virtual servers 200. The virtual server management program 130 migrates a certain virtual server to another physical server on the basis of an instruction from the resource management program 310 operating on the management server 300. Further, the virtual server management program 130 may migrate a certain virtual disk to a logical disk of another storage device.

The resource management program 310 operating on the management server 300 communicates with the path management program 120 and the virtual server management program 130 operating on each of the physical servers 100 and acquires a current state of the access path. Further, the resource management program 310 issues an instruction to the virtual server management program 130 whereby a certain virtual server is migrated to another physical server. Further, the resource management program 310 issues an instruction to the virtual server management program 130 whereby a certain virtual disk is migrated to another logical disk.

Next, data used by each program will be described.

FIG. 8 is a figure showing an example of the path information table 140 according to the configuration example.

The path information table 140 shown in FIG. 8 is a table including location information and a state of the access path 500. In an example shown in FIG. 8, the path information table 140 includes a logical disk ID, a server side port ID, a storage side port ID, and a path state as represented by the column headings. The logical disk ID is the identifier of the logical disk 420. The server side port ID is the identifier of the port 110. The storage side port ID is the identifier of the port 410. The path state takes the value of "normal" or the value of "failure." The access path 500 is determined, for example, by a combination of the port 420 and the port 110. The location information of the access path 500 is shown, for example, by the server side port ID and the storage side port ID.

FIG. 9 is a figure showing an example of the resource information table 150 according to the configuration example.

The resource information table 150 shown in FIG. 9 shows a relationship between the virtual server 200 and the virtual disk 430 allocated to the virtual server 200. As represented by the column headings, the resource information table 150 includes a virtual server ID that is the identifier of the virtual server 200 and a virtual disk ID that is the identifier of the virtual disk 430 allocated to the virtual server 200.

FIG. 10 is a figure showing an example of the virtual disk information table 160 according to the configuration example.

The virtual disk information table 160 shown in FIG. 10 shows a relationship between the virtual disk and the logical disk including the virtual disk. As represented by the column headings, the virtual disk information table 160 includes a virtual disk ID and a logical disk ID.

FIG. 11 is a figure showing an example of the configuration information table 320 according to the configuration example.

The configuration information table 320 shown in FIG. 11 shows a relationship between the virtual server and the physical server to which the virtual server is assigned. As represented by the column headings, the configuration information table 320 includes a virtual server ID and a physical server ID. The configuration management table 320 is stored in the configuration storage unit 330.

Next, the operation of this configuration example will be described with reference to the drawing.

First, an update operation for each table will be described.

In the initial state, there is no entry in the path information table 140. When the physical server 100 is connected to the certain storage device 400 via a certain access path 500, the path management program 120 detects location information of the logical disk 420 that is the connection destination and the access path 500. That is, the path management program 120 detects the server side port 110 and the storage side port 410, which are the both ends of the access path 500 over which connection is established. The path management program 120 adds an entry of the server side port 110 and the storage side port 410 in the path information table 140.

When the path management program 120 detects an error response to the I/O request sent to the logical disk 420 via the access path 500, the path management program 120 blocks the access path 500. The path management program 120 and continues the I/O process by reissuing the I/O request to another access path 500. This operation is called a path failover. At that time, the path management program 120 identifies, in the path information table 140, the entry which is associated with the logical disk 420 which is the target of the I/O request and from which the error response is received and the server side port 110 and the storage side port 310 representing the access path 500 through which the I/O request is sent. And the path management program 120 updates the path state in the identified entry to "failure."

Further, because of a change of configuration such as a change of the access path caused by a change of wire connection, or a removal of a logical disk, there are cases where an access to a certain logical disk 420 via a certain access path 500 becomes unavailable. In those cases, the path management program 120 deletes the entry identified by the combination of the access path 500 which becomes unavailable for the access to the logical disk 420 and the logical disk 420 from the path information table 140.

In the initial state, the resource information table 150 is an empty table which has no entry. The resource management program 310 allocates the virtual server 200 a virtual disk 430 which the virtual server 200 uses. At that time, the resource management program 310 transmits an allocation instruction to the virtual server management program 130 on the physical server 100 where the virtual server 200 to which the virtual disk 430 is allocated operates. The virtual server management program 130 which receives the allocation instruction allocates the virtual disk 430 to the virtual server 200. The virtual server management program 130 adds the entry of the combination of the virtual server 200 to which the virtual disk 430 is allocated and the allocated virtual disk 430 to the resource information table 150.

Further, the resource management program 310 releases the allocation of the virtual disk 430 to the virtual server 200. And the resource management program 310 transmits an allocation release instruction to the virtual server management program 130 on the physical server 100. When the virtual server management program 130 receives the release instruction, the virtual server management program 130 releases the allocation of the virtual disk 430 to the virtual server 200. The virtual server management program 130 deletes the entry of the combination of the virtual disk 430 the allocation of which is released and the virtual server 200 to which the virtual disk 430 is allocated from the resource information table 150.

In the initial state, the virtual disk information table 160 is an empty table which has no entry. The resource management program 310 specifies a logical disk 420 as an assigned position of the virtual disk 430. And the resource management program 310 transmits an assignment instruction to assign the virtual disk 430 to the specified logical disk to the virtual server management program 130 operating in the physical server 100 which can access the logical disk 420. When the virtual server management program 130 receives the assignment instruction, the virtual server management program 130 assigns the virtual disk 430 to the logical disk 420. The virtual server management program 130 adds the entry of the combination of the arranged virtual disk 430 and the logical disk 420 to which the virtual disk 430 is assigned to the virtual disk information table 160.

In the initial state, the configuration information table 320 is an empty table which has no entry. The resource management program 310 assigns a virtual server 200 to a physical server 100. Then, the resource management program 310 adds the entry of the combination of the allocated virtual server 200 and the physical server 100 to which the virtual server is allocated to the configuration information table 320.

The resource management program 310 may change the assignment destination of a virtual disk 430 from a logical disk 420 to another logical disk 420. This operation is called a storage migration. In case the storage migration is performed, when the storage migration has been completed, the resource management program 310 updates the entry of the logical disk 162 which is associated with the migrated virtual disk 430 in the virtual disk information table 160.

The resource management program 310 also changes the assignment destination of a virtual server 200 from a physical server 100 to another physical server 100. This operation is called a migration. When the migration has been completed, the resource management program 310 updates the entry of the physical server 100 which is associated with the migrated virtual server 200 in the configuration information table 320. And the resource management program 310 deletes the entry of the virtual server 200 which is migrated from the resource information table 150 and the virtual disk information table 160 which are stored in the physical server 100 on which the migrated virtual server 200 stopped operating. Further, the resource management program 310 adds the entry of the migrated virtual server 200 to the resource information table 150 and the virtual disk information table 160 which are stored in the physical server 100 that is the migration destination.

Next, a method of calculating the virtual server path redundancy degree with respect to the logical disk 420 used by each of the virtual servers 200 will be described.

The resource management program 310 identifies the physical server 100 to which the virtual server 200 is allocated by searching for the entry of a virtual server ID of the virtual server 200 that is the object in the configuration information table 320.

The resource management program 310 refers to the path information table 140, the resource information table 150, and the virtual disk information table 160 that are stored in the identified physical server 100 via the communication network 600. First, the resource management program 310 identifies the virtual disk 430 used by the virtual server 200 by searching for the entry of the virtual server ID of the virtual server 200 that is the object and in the resource information table 150.

Next, the resource management program 310 identifies the logical disk 420 to which the virtual disk 430 is assigned by searching for the entry of the identified virtual disk 430 in the virtual disk information table 160.

Further, the resource management program 310 derives the number of entries of "normal" in the "path state" column 144 by searching for the entry of the logical disk ID of the identified logical disk 420 and in the path information table 140. The resource management program 310 takes the derived number of entries as the virtual server path redundancy degree with respect to the logical disk 420 used by the virtual server 200.

Next, a method of calculating the physical server path redundancy degree of the logical disk 420 which can be accessed by the physical servers 100 will be described.

The resource management program 310 refers to the path information table 140 on the physical server 100 that is the object of the calculation of the physical server path redundancy degree via the communication network 600.

The resource management program 310 derives the number of entries of "normal" in the "path state" column 144 by searching for the entry of the logical disk ID of the logical disk 420 that is the object in the path information table 140. The resource management program 310 takes the derived number of entries as the physical server path redundancy degree representing the redundancy level of the path between the physical server 100 and the logical disk 420.

Next, the operation of the migration of the virtual server when an access path failure occurs will be described.

First, a method of finding the virtual server affected by the occurrence of the access path failure will be described.

When the path management program 120 detects the access path failure, the path management program 120 performs the above-described path failover. The path management program 120 sets the path state, which corresponds to the path state 144 in the path information table, of the access path 500 in which the failure is detected as "failure." After this operation, the path management program 120 sends a notification of failure occurrence to the resource management program 310 on the management server 300 via the communication network 600.

When the resource management program 310 receives the notification of the failure occurrence, according to the above-described method of calculation of the virtual server path redundancy degree, the resource management program 310 derives the virtual server path redundancy degree of the logical disk used by each of the virtual servers 200 on the physical server 100. The virtual server 200 whose virtual server path redundancy degree after the failure occurs is decreased compared to the virtual server path redundancy degree before the failure occurs is the virtual server 200 affected by the failure.

Next, a method of determining the migration destination of the affected virtual server will be described.

The resource management program 310 derives the physical server path redundancy degree of the path between each of the physical servers 100 and each of the logical disks 420 used by the virtual server 200 affected by the failure by the above-described method. The resource management program 310 selects the lowest physical server path redundancy degree for each of the physical servers 100 as the virtual server path redundancy degree of the physical server 100 with respect to the virtual server 200 affected by the failure. The resource management program 310 may select, as the migration destination, the physical server 100 with the highest virtual server path redundancy degree with respect to the virtual server 200 affected by the failure among the physical servers 100 to which the virtual server 100 affected by the failure can be migrated.

A method of identifying the physical server 100 to which the virtual server can be migrated used by the resource management program 310 may be a method based on the existing technique, such as a method of estimating that the physical server 100 with sufficient resources for the virtual server to operate is the physical server 100 to which the virtual server can be migrated, or the like.

In case the plurality of physical servers 100 with the highest virtual server path redundancy degree with respect to the virtual server affected by the failure exist, the resource management program 310 selects one of the physical servers as the migration destination among the servers 100 with the highest virtual server path redundancy degree. The method of selecting one of the servers as the migration destination may be an arbitrary existing method of selecting the physical server 100 that is the migration destination among the plurality of physical servers 100 with the highest virtual server path redundancy degree. The method of selecting the physical server 100 that is the migration destination is, for example, selecting the physical server 100 to which the virtual server can be migrated in a short time, selecting the physical server 100 whose I/O load after migration does not exceed a predetermined threshold, or the like.

Next, the operation of determining the physical server that is the migration destination in this configuration example will be described by using a specific example.

Figure 12:
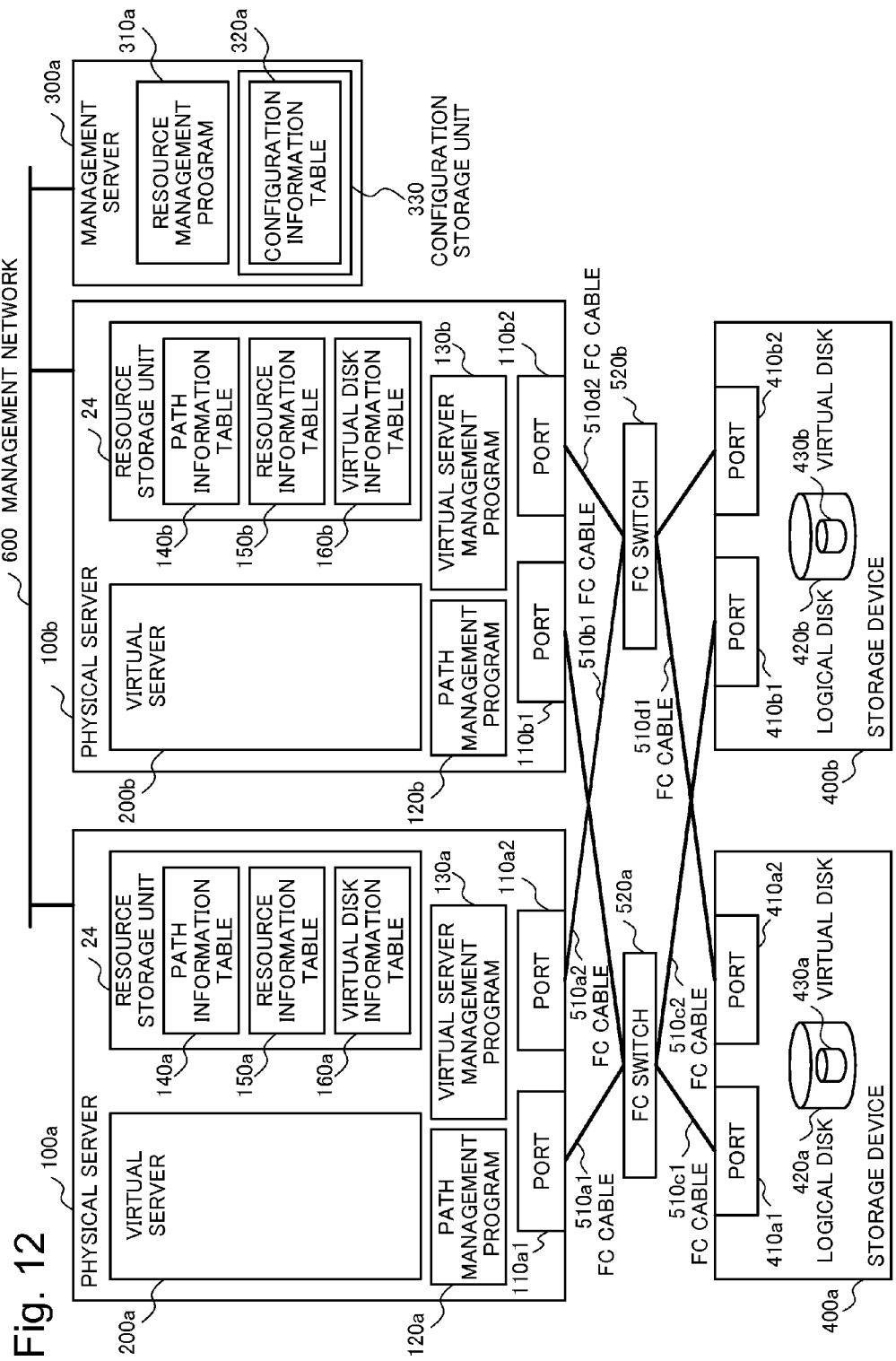
FIG. 12 is a figure showing an example of a more specific configuration of the computer system of the configuration example.

FIG. 12 is a figure showing an example of a more specific configuration of a computer system of this configuration example.

Referring to FIG. 12, the computer system of this configuration example includes two physical servers (a physical server 100*a* and a physical server 100*b*), one management server (a management server 300*a*), and two storage devices (a storage device 400*a* and a storage device 400*b*).

The physical server 100*a* includes two ports (a port 110*a*1 and a port 110*a*2). A path management program 120*a*, a virtual server management program 130*a*, and one virtual server 200*a* operate in the physical server 100*a*. A path information table 140*a*, a resource information table 150*a*, and a virtual disk information table 160*a* are stored in the resource storage unit 24 of the physical server 100*a*.

Similarly, the physical server 100*b* also includes two ports (a port 110*b*1 and a port 110*b*2). A path management program 120*b*, a virtual server management program 130*b*, and one virtual server 200*b* operate in the physical server 100*b*. A path information table 140*b*, a resource information table 150*b*, and a virtual disk information table 160*b* are stored in the resource storage unit 24 of the physical server 100*b*.

A resource management program 310*a* operates in the management server 300*a*. A virtual server information table 320*a* is stored in the configuration storage unit 330 of the management server 300*a*.

The storage device 400*a* includes two ports (a port 410*a*1 and a port 410*a*2) and one logical disk 420*a*.

Similarly, the storage device 400*b* also includes two ports (a port 410*b*1 and a port 410*b*2) and one logical disk 420*b*.

The physical servers 100*a* and 100*b* are connected with the storage devices 400*a* and 400*b* via two FC switches (an FC switch 520*a* and an FC switch 520*b*) as shown in FIG. 12. Eight FC cables 510*a*1, 510*a*2, 510*b*1, 510*b*2, 510*c*1, 510*c*2, 510*d*1, and 510*d*2 connect those devices.

Each of the physical servers 100*a* and 100*b* can access the logical disks 420*a* and 420*b*.

The physical server 100*a*, the physical server 100*b*, and the management server 300*a* are connected via a communication network 600*a*.

The virtual server 200*a* uses a virtual disk 430*a*. The virtual disk 430*a* is assigned to the logical disk 420*a* included in the storage device 400*a*.

The virtual server 200*b* uses a virtual disk 430*b*. The virtual disk 430*b* is assigned to the logical disk 420*b* included in the storage device 400*b*.

In this example, the virtual servers 200*a* and 200*b* can be individually assigned to one of the physical server 100*a* and the physical server 100*b*. Each of the physical servers 100*a* and 100*b* can operate both of the virtual servers 200*a* and 200*b* simultaneously. In this configuration example, the storage devices 400*a* and 400*b* are not able to perform storage migration. That is, the virtual disks 430*a* and 430*b* cannot be migrated to another logical disk by the storage migration.

FIG. 13 and FIG. 16 are figures showing an example of the path information table in the specific example of the configuration example.

FIG. 14 and FIG. 17 are figures showing an example of the resource information table in the specific example of the configuration example.

FIG. 15 and FIG. 18 are figures showing an example of the virtual disk information table in the specific example of the configuration example.

In the physical server 100*a* having the connecting structure represented in FIG. 12, the path information table 140*a* shown in FIG. 13, the resource information table 150*a* shown in FIG. 14, and the virtual disk information table 160*a* shown in FIG. 15 are stored.

In the physical server 100*b* having the connecting structure represented in FIG. 12, the path information table 140*b* shown in FIG. 16, the resource information table 150b shown in FIG. 17, and the virtual disk information table 160b shown in FIG. 18 are stored.

FIG. 19 is a figure showing an example of the configuration information table 320a stored in the management server 300a having the structure shown in FIG. 12.

The resource management program 310a calculates the virtual server path redundancy degree for each of the virtual servers and the physical server path redundancy degree for each of the physical servers on the basis of the tables shown in FIG. 13 to FIG. 19 by using the above-described methods.

FIG. 20 is a figure showing an example of the virtual server path redundancy degree of each of the virtual servers. In FIG. 20 to FIG. 25, both of the virtual server path redundancy degree and the physical server path redundancy degree are described as "PATH REDUNDANCY." The virtual server path redundancy degree of each of the virtual servers represented in FIG. 20 is calculated on the basis of the tables shown in FIG. 13 to FIG. 19 by the resource management program 310a by using the above-described method.

FIG. 21 is a figure showing an example of the physical server path redundancy degree of each of the physical servers. FIG. 21 shows the physical server path redundancy degrees which the resource management program 310 calculates on the basis of the tables shown in FIG. 13 to FIG. 19 by using the above-described method.

When a failure occurs in the path connecting between the port 110a1 in the physical server 100a and the FC switch 520a, each program of each device in the computer system operates as follows.

The path management program 120a operating in the physical server 100a detects the failure which occurs in the above-described path and updates the path information table 140a.

FIG. 22 is a figure showing an example of the path information table 140 after the failure occurs. The table represented in FIG. 22 is an example of the path information table 140 updated by the path management program 120a after the detection of the above-described failure.

Next, the resource management program 310a recalculates the virtual server path redundancy degrees and the physical server path redundancy degrees using the updated path information table 140.

FIG. 23 is a figure showing an example of the virtual server path redundancy degrees recalculated after the failure occurs. FIG. 23 shows the virtual server path redundancy degrees recalculated using the updated path information table 140 by the path management program 120a.

FIG. 24 is a figure showing an example of the physical server path redundancy degrees recalculated after the failure occurs. FIG. 24 shows the physical server path redundancy degrees recalculated using the updated path information table 140 by the path management program 120a.

Next, the resource management program 310a identifies the virtual server affected by the failure. The resource management program 310a specifies the virtual server whose virtual server path redundancy degree with respect to the logical disk used by the virtual server decreases by comparing the virtual server path redundancy degree before the failure detection with the virtual server path redundancy degree after the failure detection. According to a comparison between FIG. 21 representing the virtual server path redundancy degrees before the failure detection and FIG. 23 representing the virtual server path redundancy degrees after the failure detection, the degree of redundancy of the logical disk 420a used by the virtual server 200a, which was four before the failure detection, decreases to two. The resource management program 310a specifies the virtual server 200a as the virtual server affected by the failure.

Next, the resource management program 310a determines the physical server that is the migration destination of the virtual server 200a. The resource management program 310a selects the physical server which has the highest redundancy of the path to the logical disk used by the virtual server 200a among the servers to which the virtual server 200a can be migrated. The resource management program 310a sets the selected server as the physical server that is the migration destination of the virtual server 200a. In this example, each of the virtual servers 100a and 100b uses one logical disk. Therefore, in this example, the smallest virtual server path redundancy degree of a physical server with respect to each logical disk used by a virtual server is equal to the physical server path redundancy degree of the path between the physical server and the logical disk.

In FIG. 24 representing the physical server path redundancy degree after the failure occurs, the physical server path redundancy degree of the path between the physical server 100a and the logical disk 420a used by the virtual server 200a is 2. According to a comparison between FIG. 21 and FIG. 24, the physical server path redundancy degree of the path between the physical server 100a and the logical disk 420a which is used by the virtual server 200a, which was four before the failure occurs, decreases to two after the failure occurs. On the other hand, the physical server path redundancy degree of the path between the physical server 100b and the logical disk 420a is four. The physical server path redundancy degree of the path between the physical server 100b and the logical disk 420a remains unchanged and is four after the failure occurs. The resource management program 310a selects the physical server 100b.

The virtual server 200a can operate even when being migrated to the physical server 100b. The physical server 100b can operate the virtual servers 200a and 200b simultaneously. Accordingly, the virtual server 200a can be migrated to the physical server 100b. The resource management program 310a selects the physical server 100b as the migration destination of the virtual server 200a.

The resource management program 310a migrates the virtual server 200a to the physical server 100b from the physical server 100a.

FIG. 25 is a figure showing an example of the virtual server path redundancy degrees after migration. FIG. 25 shows the virtual server path redundancy degrees after the resource management program 310a migrates the virtual server 200a to the physical server 100b from the physical server 100a. According to a comparison between FIG. 24 and FIG. 25, the virtual server path redundancy degree of the virtual server 200a after the migration increases in comparison with the virtual server path redundancy degree before the migration.

This configuration example can be modified so that each virtual server directly accesses logical servers included in the storage devices.

Figure 26:
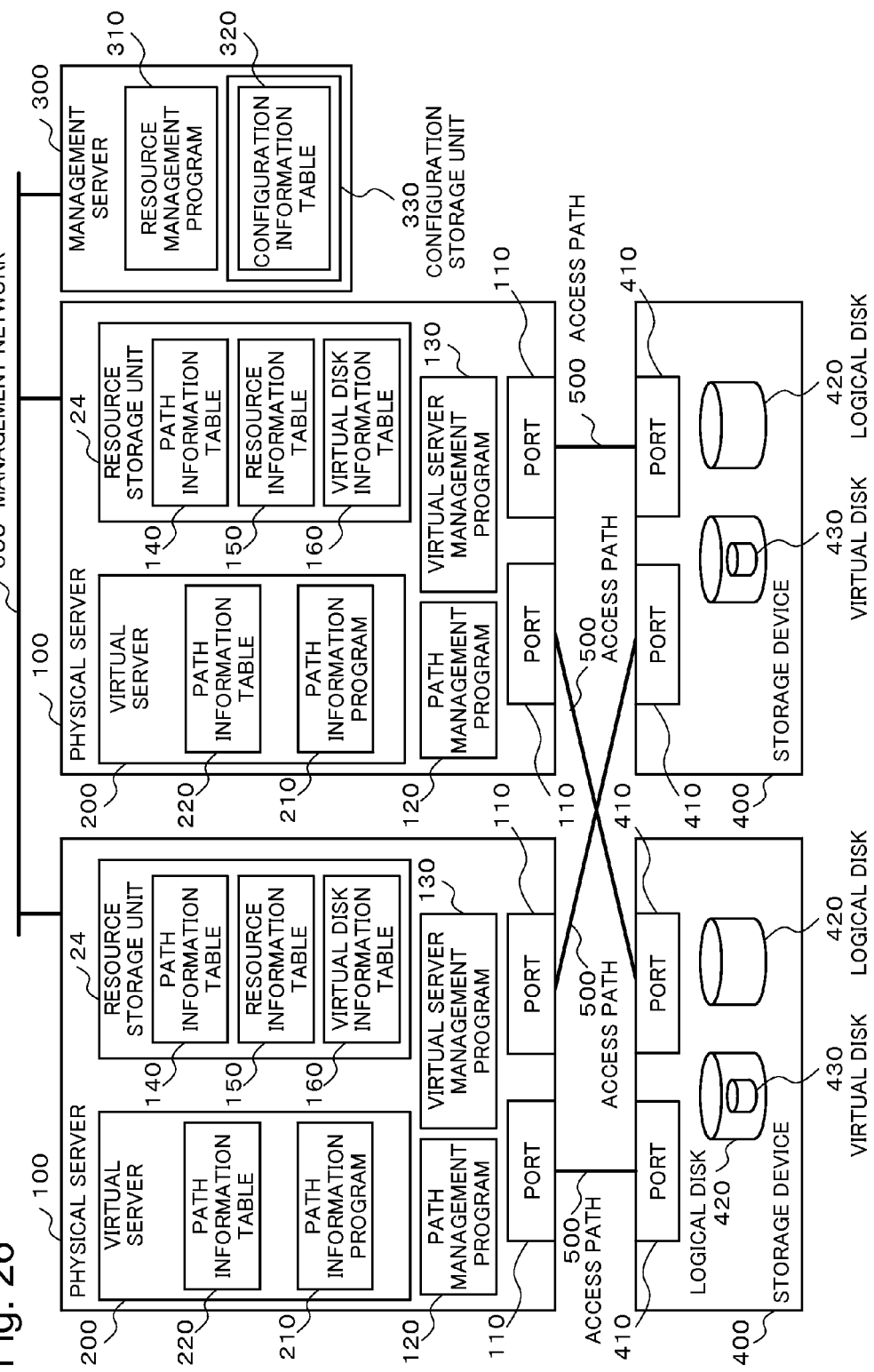
FIG. 26 is a figure showing an example of a configuration of a computer system in the modified configuration example.

FIG. 26 is a figure showing a configuration of a computer system according to the modified example obtained by modifying the configuration example as described above. The configuration of this modified example is the same as the configuration shown in FIG. 7 except for the following points. In the computer system of this modified example, the virtual server 200 may include the path management table 220. The path management program 210 may operate on the virtual server 200. The path management program 210 performs the same operation as the above-described path management program 120. The path management program 210 updates, instead of the path management table 140, the path management table 220 included in the virtual server 200. When calculating the virtual server path redundancy degrees, the resource management program 310 reads out information of the path information table 220 stored in the virtual server 100 in addition to the information of the path information table 140 stored in the physical server 100.

In the first exemplary embodiment and the configuration example, the management device 1 and the management server 300 determine the migration destination of the computer resource with an actual occurrence of a failure as a trigger. In this case, the occurrence of the failure is used as a trigger. On the other hand, while the failure does not yet actually occur, the management device 1 and the management server 300 may calculate the virtual server path redundancy degrees and the physical server path redundancy degrees in a variety of cases where the path in which a failure occurs is different and may create a migration plan to migrate the virtual server 200, which is used when the failure occurs.

Next, a second exemplary embodiment of the present invention will be described in detail with reference to the drawing.

Figure 27:
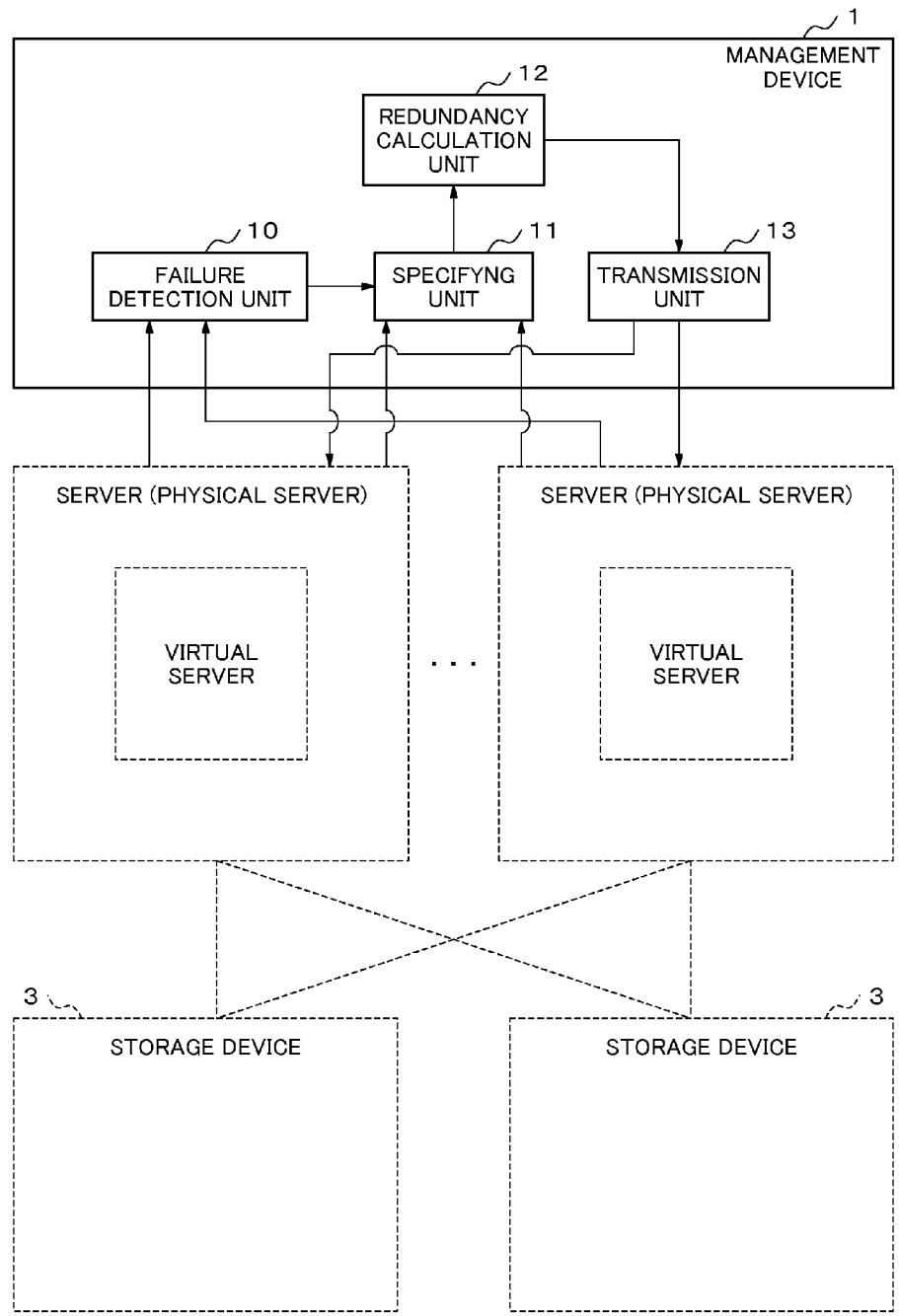
FIG. 27 is a figure showing an example of a configuration of the management device 1 according to a second exemplary embodiment.

FIG. 27 shows a block diagram showing a configuration of the management device 1 according to the second exemplary embodiment.

Referring to FIG. 27, a management device comprises a failure detection unit 10 which detects a failure in a plurality of paths connecting servers, on at least one of which a virtual machine operates, with a storage device, a specifying unit 11 which specifies the virtual machine operating on the failed server that is the server connected by the path in which the failure is detected, a redundancy calculation unit 12 which calculates, for each of the servers, a first redundancy degree of the server with respect to the storage device, which represents a degree of redundancy of the path between the server and the storage device, a selection unit 13 which selects, among the servers, a server having the degree of redundancy higher than the degree of redundancy of the failed server on the basis of the first redundancy degrees of the servers, and a transmission unit 14 which transmits migration instruction information including an identifier of the specified virtual machine and an identifier of the selected server.

As described above, the physical server 2 is also described simply as the server. The virtual server 21 is also described as the virtual machine.

The exemplary embodiment described above has the same effect as the first exemplary embodiment. The reason is the same as the reason of the effect of the first exemplary embodiment.

Each of the management device 1, the physical server 2, and the storage device 3 can be implemented using a computer with a program which controls the computer, dedicated hardware, or a combination of a computer with a program which controls the computer and dedicated hardware.

Figure 28:
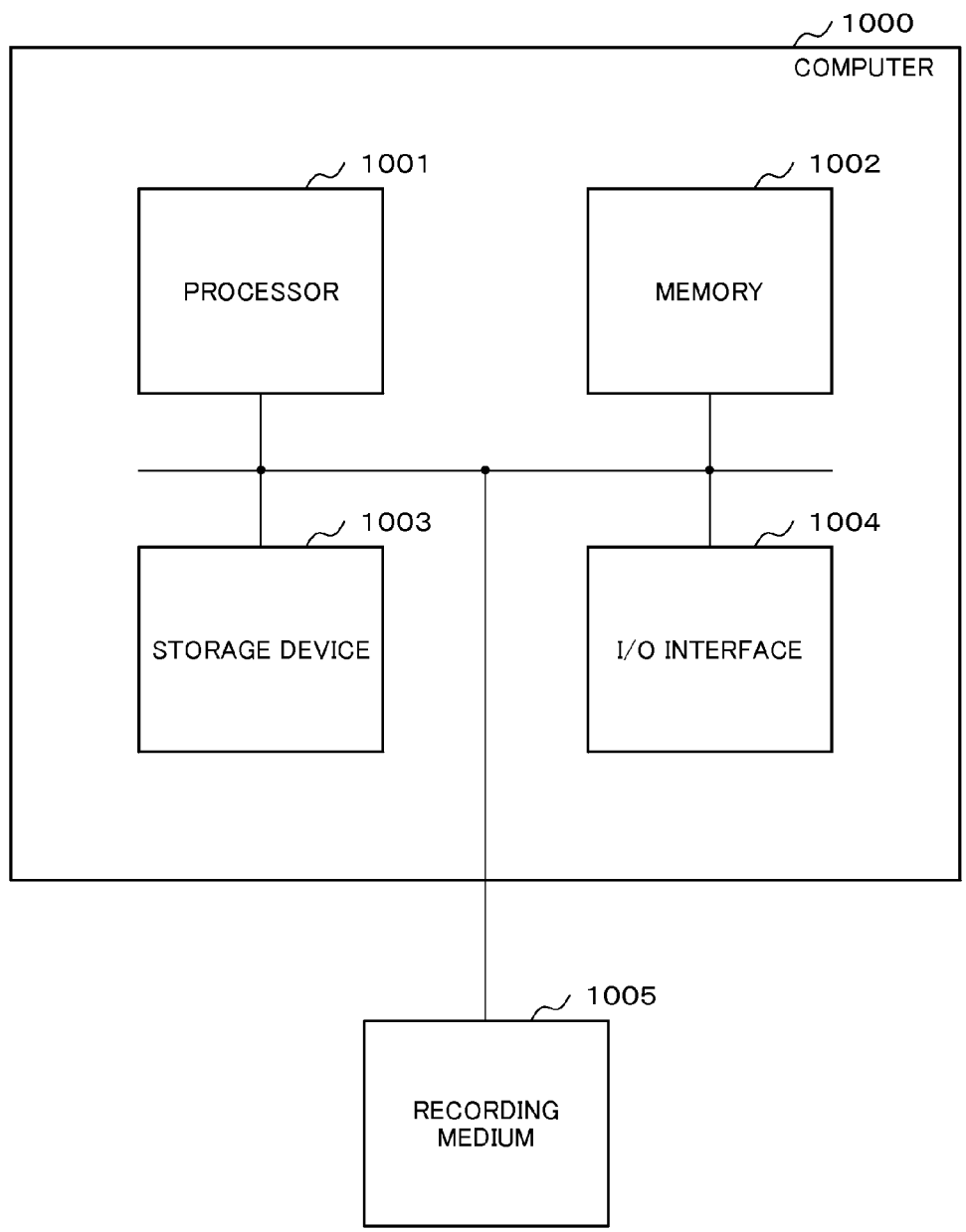
FIG. 28 is a figure showing an example of configuration of a computer 1000 used for implementing the management device 1, the physical server 2, and the storage device 3.

FIG. 28 is a figure showing an example of configuration of a computer 1000 used for implementing the management device 1, the physical server 2, and the storage device 3. Referring to FIG. 28, the computer 1000 includes a processor 1001, a memory 1002, a storage device 1003, and an I/O (Input/Output) interface 1004. The computer 1000 can access a recording medium 1005. The memory 1002 and the storage device 1003 are storage devices such as a RAM (Random Access Memory), a hard disk, or the like. The recording medium 1005 is, for example, a RAM, a storage device such as a hard disk or the like, a ROM (Read Only Memory), or a portable recording medium. The storage device 1003 may be used as the recording medium 1005. The processor 1001 can read out data and a program from the memory 1002 and the storage device 1003, and can store data in the memory 1002 and the storage device 1003. The processor 1001 can access at least one of, for example, the physical server 2, the storage device 3, and the management device 1 via the I/O interface 1004. The processor 1001 can access the recording medium 1005. A program which causes the computer 1000 to function as the management device 1, the physical server 2, or the storage device 3 is stored in the recording medium 1005.

The processor 1001 loads the program which is stored in the recording medium 1005 and which causes the computer 1000 to function as the management device 1, the physical server 2, or the storage device 3 into the memory 1002. The processor 1001 executes the program loaded into the memory 1002, whereby the computer 1000 operates as the management device 1, the physical server 2, or the storage device 3.

The failure detection unit 10, the specifying unit 11, the redundancy calculation unit 12, the selection unit 13, the transmission unit 14, the load detection unit 16, the virtual server 21, the virtual server management unit 22, and the path management unit 23 may be implemented using, for example, a dedicated program which realizes the function of each unit, which is read into the memory from the recording medium 1005 which stores the program, and the processor 1001 that executes the program. The redundancy storage unit 15, the resource storage unit 24, and the disk 31 may be implemented using the memory 1002 included in the computer 1000 or the storage device 1003, such as a hard disk device or the like. Alternatively, a part or all of the failure detection unit 10, the specifying unit 11, the redundancy calculation unit 12, the selection unit 13, the transmission unit 14, the redundancy storage unit 15, the load detection unit 16, the virtual server 21, the virtual server management unit 22, the path management unit 23, the resource storage unit 24, and the disk 31 may be implemented using a dedicated circuit which realizes the function of each unit.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A management device comprising:
a failure detection unit which detects a failure in a plurality of paths connecting servers, on at least one of which a virtual machine operates, with a storage device;
a specifying unit which specifies the virtual machine operating on the failed server that is the server connected by the path in which the failure is detected;
a redundancy calculation unit which calculates, for each of the servers, a first redundancy degree of the server with respect to the storage device, which represents a degree of redundancy of the path between the server and the storage device;
a selection unit which selects, among the servers, a server having a redundancy which meets a predefined condition on the basis of the first redundancy degrees of the servers; and a transmission unit which transmits migration instruction information for migration of the specified virtual machine from the failed server to the selected server.

2. The management device of claim 1 wherein
each of the servers is connected with one or more of the storage devices by two or more of the paths,
the redundancy calculation unit calculates, for each virtual machine operating on the failed server, a second redundancy degree of the failed server with respect to the virtual machine, which is the lowest first redundancy degree of the failed server with respect to each of the storage devices used by the virtual machine,
the specifying unit specifies the virtual machine estimated to be affected by the failure in the path on the basis of the second redundancy degree, and
the selection unit selects the server, among the servers, having the second redundancy degree with respect to the specified virtual server larger than that of the failed server.

3. The management device of claim 1 comprising:
a load detection unit which detects a load of each of the servers, wherein
the selection unit selects the server whose degree of redundancy is the highest among the servers whose detected load is smaller than a predetermined threshold value.

4. An information processing system including the server, the storage device, and the management device of claim 1.

5. A management method comprising:
detecting a failure in a plurality of paths which connect servers, on at least one of which a virtual machine operates, with a storage device;
specifying the virtual machine operating on the failed server that is the server which is connected by the path in which the failure is detected;
calculating, for each of the servers, a first redundancy degree of the server with respect to the storage device, which represents a degree of redundancy of the path between the server and the storage device;
selecting, among the servers, a server having a redundancy which meets a predefined condition on the basis of the first redundancy degrees of the servers; and
transmitting migration instruction information for migration of the specified virtual machine from the failed server to the selected server.

6. The management method of claim 5 further comprising:
connecting each of the servers with one or more of the storage devices by two or more of the paths,
calculating, for each virtual machine operating on the failed server, a second redundancy degree of the failed server with respect to the virtual machine, which is the lowest first redundancy degree of the failed server with respect to each of the storage devices used by the virtual machine,
specifying the virtual machine estimated to be affected by the failure in the path on the basis of the second redundancy degree, and
selecting the server, among the servers, having the second redundancy degree with respect to the specified virtual server larger than that of the failed server.

7. The management method of claim 6 further comprising:
detecting a load of each of the servers; and
selecting the server whose degree of redundancy is the highest among the servers whose detected load is smaller than a predetermined threshold value.

8. A non-transitory computer-readable medium storing a management program which causes a computer to function as:
a failure detection unit which detects a failure in a plurality of paths which connect servers, on at least one of which a virtual machine operates, with a storage device;
a specifying unit which specifies the virtual machine operating on the failed server that is the server which is connected by the path in which the failure is detected;
a redundancy calculation unit which calculates, for each of the servers, a first redundancy degree of the server with respect to the storage device, which represents a degree of redundancy of the path between the server and the storage device;
a selection unit which selects, among the servers, a server having a redundancy which meets a predefined condition on the basis of the first redundancy degrees of the servers; and
a transmission unit which transmits migration instruction information for migration of the specified virtual machine from the failed server to the selected server.

9. The non-transitory computer-readable medium of claim 8 storing the management program which further causes a computer to function as:
the failure detection unit detects the failure in the plurality of paths which connect servers with a plurality of the storage devices, each of the servers being connected with one or more of the storage devices by two or more of the paths;
the redundancy calculation unit which calculates, for each virtual machine operating on the failed server, a second redundancy degree of the failed server with respect to the virtual machine, which is the lowest first redundancy degree of the failed server with respect to each of the storage devices used by the virtual machine;
the specifying unit which specifies the virtual machine estimated to be affected by the failure in the path on the basis of the second redundancy degree; and
the selection unit which selects the server, among the servers, having the second redundancy degree with respect to the specified virtual server larger than that of the failed server.

10. The non-transitory computer-readable medium of claim 8 storing the management program which further causes a computer to function as:
a load detection unit which detects a load of each of the servers; and
the selection unit which selects the server whose degree of redundancy is the highest among the servers whose detected load is smaller than a predetermined threshold value.

* * * * *